(12) United States Patent
Gil et al.

(10) Patent No.: US 12,511,636 B1
(45) Date of Patent: Dec. 30, 2025

(54) ITEM RETURN FOR CUSTOMIZED RETAIL ENVIRONMENTS

(71) Applicant: Amazon Technologies, Inc., Seattle, WA (US)

(72) Inventors: Christopher Mario Gil, Tacoma, WA (US); Edwin Thorne, III, Shoreline, WA (US); Sachin Rajendra Kothari, Issaquah, WA (US); Wenbo Cui, Bellevue, WA (US); Pyotr Belov, Bellevue, WA (US); Nathan P O'Neill, Snohomish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 372 days.

(21) Appl. No.: 18/214,349

(22) Filed: Jun. 26, 2023

(51) Int. Cl.
| | | |
|---|---|---|
| *G06Q 20/20* | (2012.01) | |
| *G06K 7/10* | (2006.01) | |
| *G06K 19/07* | (2006.01) | |
| *G06Q 10/087* | (2023.01) | |
| *G06Q 30/0601* | (2023.01) | |

(52) U.S. Cl.
CPC ........ *G06Q 20/208* (2013.01); *G06K 7/10297* (2013.01); *G06K 7/10356* (2013.01); *G06Q 10/087* (2013.01); *G06Q 30/0633* (2013.01); *G06K 19/0723* (2013.01)

(58) Field of Classification Search
CPC ............... G06Q 20/208; G06Q 10/087; G06Q 30/0633; G06K 7/10297; G06K 7/10356; G06K 19/0723
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 11,938,990 B1 * | 3/2024 | Burch | B62B 5/0096 |
| 12,060,099 B1 * | 8/2024 | Hager | G06Q 10/087 |
| 12,084,104 B1 * | 9/2024 | Alameh | G06Q 10/087 |
| 2013/0284806 A1 | 10/2013 | Margalit | |
| 2018/0276739 A1 * | 9/2018 | Chopp | G06Q 10/0837 |
| 2022/0067688 A1 * | 3/2022 | Patel | G06N 3/045 |
| 2022/0114868 A1 * | 4/2022 | Bronicki | G06Q 20/40145 |
| 2023/0298084 A1 * | 9/2023 | Frank | G06Q 30/0633 705/26.8 |

* cited by examiner

*Primary Examiner* — Michael Jared Walker
(74) *Attorney, Agent, or Firm* — Athorus, PLLC

(57) ABSTRACT

This disclosure describes, in part, systems for enabling a return of an item from an item-identification apparatus without requiring associate intervention. The systems and techniques herein provide for determining, based on first sensor data, that an item was placed in a receptacle and updating a virtual cart associated with a user operating the receptacle to indicate addition of the item. The system may then include a put back bin equipped with sensors to detect when an item is placed within a put back bin and thereby cause the system to update the virtual cart to indicate removal of the item before instructing to charge a payment instrument associated with the virtual cart.

19 Claims, 9 Drawing Sheets

ITEM RETURN FOR CUSTOMIZED RETAIL ENVIRONMENTS

BACKGROUND

Traditional physical stores maintain an inventory of items in customer-accessible areas such that customers can pick items from the inventory and take them to a checkout station for purchase, rental, and so forth. For example, a customer may take an item, such as a shirt, from a rack located within the store. The customer may then take the shirt to a cashier and/or a self-checkout station that is located near an entrance of the store. The cashier will scan each item to generate a list of items for the transaction or, in the case of a self-checkout station, the customer will individually scan the items they intend to purchase. Using a point-of-sale device, the cashier and/or self-checkout kiosk may process a transaction for a price of the shirt. For example, the cashier may input payment information, such as a card number, into the point-of-sale device, which may charge the card of the customer for the price of the shirt and/or the self-checkout kiosk may receive payment information as input by a customer to pay for items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
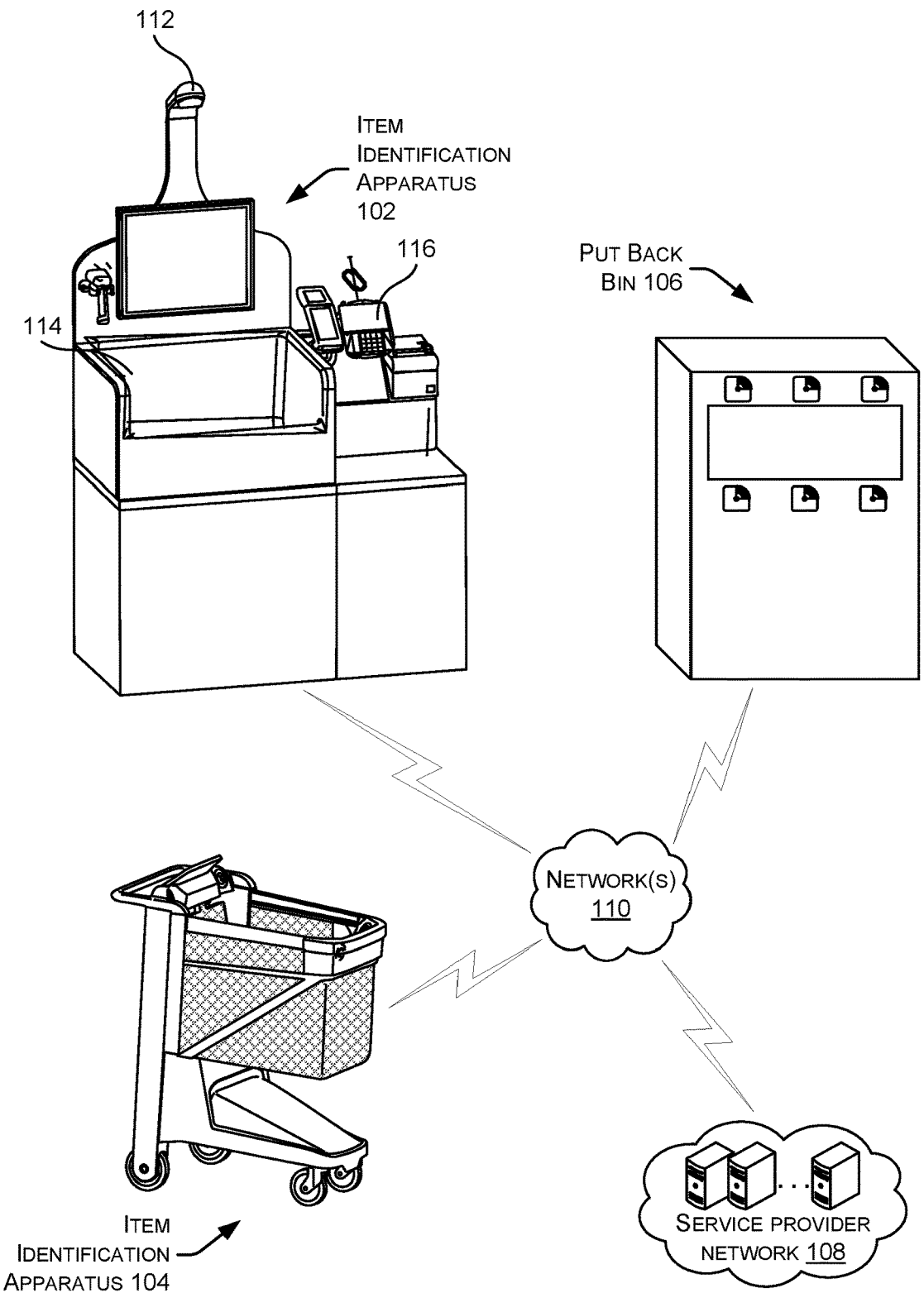
FIG. 1 illustrates a system for providing a customized retail environment to enable automated return of items from a self-checkout kiosk or other item identifying apparatus, according to at least one example.

This disclosure describes, in part, systems for enabling facilities (e.g., physical retail stores) to implement technology that is able to automatically determine items that users possess when exiting facilities and while using a self-checkout or other automated checkout system. For instance, a system may use sensors located within a facility, such as cameras, to determine locations of a user as (and/or after) the user navigates throughout the facility. The system may further use sensors located within the facility, such as signal receivers, to determine locations of an item throughout the facility. The system may then use the locations of the user as well as the locations of the item to determine that the user was in possession of the item while within the facility and/or while exiting the facility. The system may also include one or more put back bins that are capable of identifying items placed therein to update a virtual cart associated with the user to remove the item and thereby avoid charging for the item. As such, the system may associate an identifier of the item with an account of the user. Additionally, the system may use payment information, which may be stored in association with the account, to automatically process a transaction for the price of the item (e.g., process the transaction without manual checkout).

In particular, this disclosure describes systems for use within a facility that uses a self-checkout point of sale system, such as for retail stores. The self-checkout may enable a user to place items within a read zone without scanning a barcode or other indicator, and the system subsequently generates a virtual cart of the items placed within the read zone. In some examples, the system may use radio frequency identification (RFID), Bluetooth low energy (BLE), image-based techniques, or other systems to detect and track items that a customer intends to purchase. The self-checkout system may use an item identification apparatus, such as a self-checkout kiosk, item identifying cart, or other such mobile apparatus. The system may differ from conventional self-checkout systems in that the customer does not need to individually scan items. Instead, the customer may bring all items they intend to purchase to the item identification apparatus and place them into a designated read zone or receptacle. The items may be identified within the read zone using one or more item identification techniques and systems such as RFID technology, vision-based identification, BLE-based identification, or other such system. Accordingly, each item may be equipped with a tag, identifier, marker, or other such information that may be linked with an Electronic Product Code (EPC). When the items are placed into the read zone, the system identifies the collection of items, the associated EPCs, and the item information is added into a digital shopping cart that may be displayed on a screen for the customer to review before completing the transaction.

As part of the self-checkout system, the system includes the ability to add and/or remove items from the virtual cart prior to completing the transaction without assistance from a store associate. In traditional or typical self-checkout systems, the items may be freely added by the customer as they are scanned, however, typical systems do not provide the ability to remove an item without assistance. Traditional self-checkout stations in stores often require associate intervention in order to prevent shrinkage and to ensure that any items that are returned at the checkout station or otherwise not purchased are appropriately re-stocked rather than left haphazardly throughout the facility.

In accordance with the present description, the system may continue to read and/or identify the items in the read zone until the transaction is completed. This enables the system to keep a real-time accounting of the items and dynamically update the virtual cart. For example, if the customer initially places 3 items in the read zone, the virtual shopping cart may show those 3 items and the total purchase price. If the customer then adds a fourth item, the virtual cart updates automatically showing the customer that the fourth item has been added and the total purchase price is also updated. If the customer decides not to purchase an item that has already been added to the virtual cart (e.g., either because it was added to a mobile apparatus such as a smart shopping cart or a self-checkout kiosk), the customer can remove the item from the read zone and place it into a designated put back bin, at which time the item will be automatically removed from the virtual shopping cart and the total purchase price will be updated. This process can be repeated iteratively until the customer completes their transaction.

The system described herein provides for the customer to remove items from the virtual cart without associate intervention via the use of the put back bin. The put back bin can be any receptacle where items can be inserted by customers, but may not be readily removed by customers, similar to a post office box or other deposit box. The put back bin may perform one or more of the following operations. The put back bin may shield items from the item identification apparatus (e.g., shields RFID tags or other identifiers) to prevent items that are placed in the put back bin from remaining in a virtual cart of a customer. Shielding may also help prevent items from inadvertently being added to a virtual cart of a customer. The put back bin may also include one or more sensors and/or an array of sensors to identify items that are placed within the put back bin by the customers. The detection of items in the put back bin provides a confirmation that the item being removed from a customer's virtual cart is accounted for by the store without requiring an associate to intervene. Further, the put back bin provides a designated place for customers to place items they no longer wish to purchase, either throughout the facility or at or near an exit of the facility. The put back bin therefore provides a single gathering point where items are collected to be re-stocked. This ensures that items are properly re-stocked after customers may change their mind or decide not to purchase an item, and can be used to alert associates which items need to be re-stocked. The put back bin may also be able to use the sensor data to identify items contained therein and communicate with a management system of the facility to record the contents accurately and provide one or more notifications when items need to be re-stocked, for example due to the put back bin becoming full, having temperature controlled items within the put back bin, having too many of a particular item off of the shelves and in the put back bin, or other such conditions.

For more detail about the facility, customized retail facilities include inventory locations housing one or more items that may be ordered, received, picked, and/or returned by users. These inventory locations may be associated with one or more sensors configured to generate sensor data indicative of events that occur with respect to the items housed thereupon. For example, these sensors may generate sensor data indicative of a user (and/or associated of the facility) removing an item from the inventory location, returning the item to the inventory location, and/or the like. These sensors may include overhead cameras, in-shelf cameras, weight sensors, and/or any other type of sensor configured to generate sensor data indicative of user interactions with the items. An inventory management system (e.g., the system) may communicate with the sensors in order to receive the sensor data.

In addition, the facility may include, in some instances, one or more entry locations for entering the facility and one or more exit locations for exiting the facility. For example, the facility may include an entry location at which an entering user provides information for identifying an account of the user. For instance, the entry location may include a scanner or other imaging device at which an entering user scans or otherwise provides a unique code associated with the account of the user, such as a code displayed on a mobile device of the user. Or the entry location may include a microphone, camera, or other sensor that generates sensor data at the request of the user for use in identifying the account of the user. In still other instances, the entry location may include an input device for reading information from a payment card of a user, such as a credit card, debit card, prepaid card, etc. For example, the entry location may include a scanner or camera that scans or captures an image of a payment card, a card reader that receives information from a payment card via a swipe, dip, tap, or the like, or may include any other type of input device configured to receive payment or account information.

In some instances, the account of the user may be associated with a payment instrument of the user such that the payment instrument is able to be charged for items procured by the user, with the charge occurring automatically upon exit of the facility by the user and without the user needing to engage in a manual checkout process of the items. Accordingly, the facility may include an exit location where an exiting user provides information for identifying an account of the exiting user. The exit location may include, similar to the entry location, a scanner or other imaging device at which the exiting user scans or otherwise provides a unique code associated with the account of the user, such as the code displayed on the mobile device of the user. Or the exit location may include a microphone, camera, or other sensor that generates sensor data at the request of the user for use in identifying the account of the exiting user.

Note that the facility may also include entry and exit locations at which users may enter and exit without providing identifying information. For instance, users may be allowed access to the facility in a manner similar to a traditional retail facility to allow users to shop or otherwise interact with items at the retail facility without needing to provide information for identifying user accounts. In some examples, the user may be allowed to enter the facility, then provide information for identifying a user account at an ordering location within the facility. Also, at least one exit location may resemble a traditional exit location at a retail facility, including an associate of the facility operating a point of sale (POS) device to manually check out the exiting user, such as an exiting user wishing to pay for items in cash. Of course, it is to be appreciated that the facility may include self-checkout kiosks or any other technology for enabling manual checkout of the items within the facility.

Within this example facility, if a user enters through an entry location and provides information identifying an account of the user, or the user enters the facility and provides information identifying the account of the user at an ordering location, then the system associated with the facility may generate a record indicating the presence of the user at the facility. The record may store an indication of the identity of the user, as well as an indication of whether the user is currently eligible to exit the facility (with items procured by the user) via the exit location.

Upon finishing his or her shopping, the user may approach the exit location and, in some instances, scan or otherwise provide identifying information to enable the system to identify the exiting user. After scanning his or her unique code at the exit location, for instance, the user may exit the facility. The system, meanwhile, may thereafter charge an account of the identified exiting user for a price of the items procured by the user within the facility. Of course, while the above example describes the user scanning a unique code (e.g., via a mobile device of the user), it is to be appreciated that the exiting user may be identified based at least in part on other sensor data, such as image data, voice data, or the like. In some examples, such as described above, the user may be directed to exit by one or more lights, gates, or directional signals at the exit of the facility.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, an amusement park, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system 100 for providing a customized retail environment to enable automated return of items from a self-checkout kiosk or other item identifying apparatus, according to at least one example. The system 100 may be a system that is implemented within a facility, such as described herein (for example with respect to FIG. 9). The system 100 may be implemented as part of an overall automated checkout system, self-checkout system, or other such system that may operate primarily without requiring interaction between customers and associates, or requiring individual scanning of items selected by users. The system includes an item identification apparatus 102, an item identification apparatus 104, a put back bin 106, a service provider network 108, and a network 110.

The item identification apparatus 102 includes a self-checkout kiosk that may enable a user to place items within a read zone (such as a basket or receptacle 114) without scanning a barcode or other indicator, and the system 100 subsequently generates a virtual cart of the items placed within the read zone. In some examples, the item identification apparatus 102 may use radio frequency identification (RFID), Bluetooth low energy (BLE), image-based techniques, or other systems to detect and track items that a customer intends to purchase. The item identification apparatus 102 may differ from conventional self-checkout systems in that the customer does not need to individually scan items. Instead, the customer may bring all items they intend to purchase to the item identification apparatus 102 and place them into a designated read zone or receptacle 114. The items may be identified within the read zone using one or more item identification techniques and systems such as RFID technology, vision-based identification, BLE-based identification, or other such system. Accordingly, each item may be equipped with a tag, identifier, marker, or other such information that may be linked with an Electronic Product Code (EPC). When the items are placed into the read zone, the system identifies the collection of items, the associated EPCs, and the item information is added into a virtual cart that may be displayed on a screen for the customer to review before completing the transaction.

In some examples, the item identification apparatus 102 may use a combination of sensors to determine the identity of the items within the receptacle 114. For example, the item identification apparatus 102 may use a camera 112 to determine when a customer approaches the item identification apparatus 102 and/or places items within the receptacle 114. The signal from the camera 112 may be used by the item identification apparatus 102 to trigger a second sensor system to gather information regarding the items in the receptacle 114. For example, the camera 112 may detect items placed within the receptacle 114 and one or more RFID antennas positioned around and/or within the receptacle may be used to read RFID tags on the items placed within the receptacle. In this manner, the RFID antenna need not be operating in a read mode or operational mode full-time, and may therefore conserve energy and reduce Radio Frequency (RF) signals present within the facility.

As part of the item identification apparatus 102, the system 100 enables the user to add and/or remove items from the virtual cart prior to completing the transaction without assistance from a store associate. The user may complete their transaction with an interface 116. In traditional or typical self-checkout systems, the items may be freely added by the customer as they are scanned, however, typical systems do not provide the ability to remove an item without assistance. Traditional self-checkout stations in stores often require associate intervention in order to prevent shrinkage and to ensure that any items that are returned at the checkout station or otherwise not purchased are appropriately re-stocked rather than left haphazardly throughout the facility.

In accordance with the present description, the item identification apparatus 102 may continue to read and/or identify the items in the read zone until the transaction is completed. This enables the service provider network 108 to keep a real-time accounting of the items and dynamically update the virtual cart. For example, if the customer initially places 3 items in the read zone, the virtual shopping cart may show those 3 items and the total purchase price. If the customer then adds a fourth item, the virtual cart updates automatically showing the customer that the fourth item has been added and the total purchase price is also updated. If the customer decides not to purchase an item that has already been added to the virtual cart (e.g., either because it was added to a mobile apparatus such as a smart shopping cart or a self-checkout kiosk), the customer can remove the item from the read zone and place it into a designated put back bin 106, at which time the item will be automatically removed from the virtual shopping cart and the total purchase price will be updated. This process can be repeated iteratively until the customer completes their transaction.

The item identification apparatus 104 includes a smart cart that may be used by a customer within the facility to select, identify, and store items as the user traverses the facility. The item identification apparatus 104 may include one or more sensors or systems configured to detect and identify items placed therein, such that the service provider network 108 is able to build a virtual cart associated with the user of items selected by the user. The item identification apparatus 104 may be similar or identical to the apparatus 700 of FIG. 7.

The put back bin 106 may be any receptacle where items can be inserted by customers, but may not be readily removed by customers, similar to a post office box or other deposit box. The put back bin 106 may perform one or more of the following operations. The put back bin 106 may shield items from the item identification apparatus (e.g., shields RFID tags or other identifiers) to prevent items that are placed in the put back bin 106 from remaining in a virtual cart of a customer (e.g., as determined by the service provider network 108). Shielding may also help prevent items from inadvertently being added to a virtual cart of a customer.

The put back bin 106 may also include one or more sensors and/or an array of sensors to identify items that are placed within the put back bin 106 by the customers. The detection of items in the put back bin 106 provides a confirmation that the item being removed from a customer's virtual cart is accounted for by the store without requiring an associate to intervene.

Further, the put back bin 106 may provide a designated place for customers to place items they no longer wish to purchase, either throughout the facility or at or near an exit of the facility. The put back bin 106 may provide a single gathering point where items are collected to be re-stocked. This ensures that items are properly re-stocked after customers may change their mind or decide not to purchase an item, and can be used to alert associates which items need to be re-stocked. The put back bin 106 may also be able to use the sensor data from one or more sensors coupled to and/or in proximity of the put back bin 106 to identify items contained therein and communicate with the service provider network 108 to record the contents accurately and provide one or more notifications when items need to be re-stocked, for example due to the put back bin 106 becoming full, having temperature-controlled items within the put back bin 106, having too many of a particular item off of the shelves and in the put back bin 106, or other such conditions.

Figure 8:
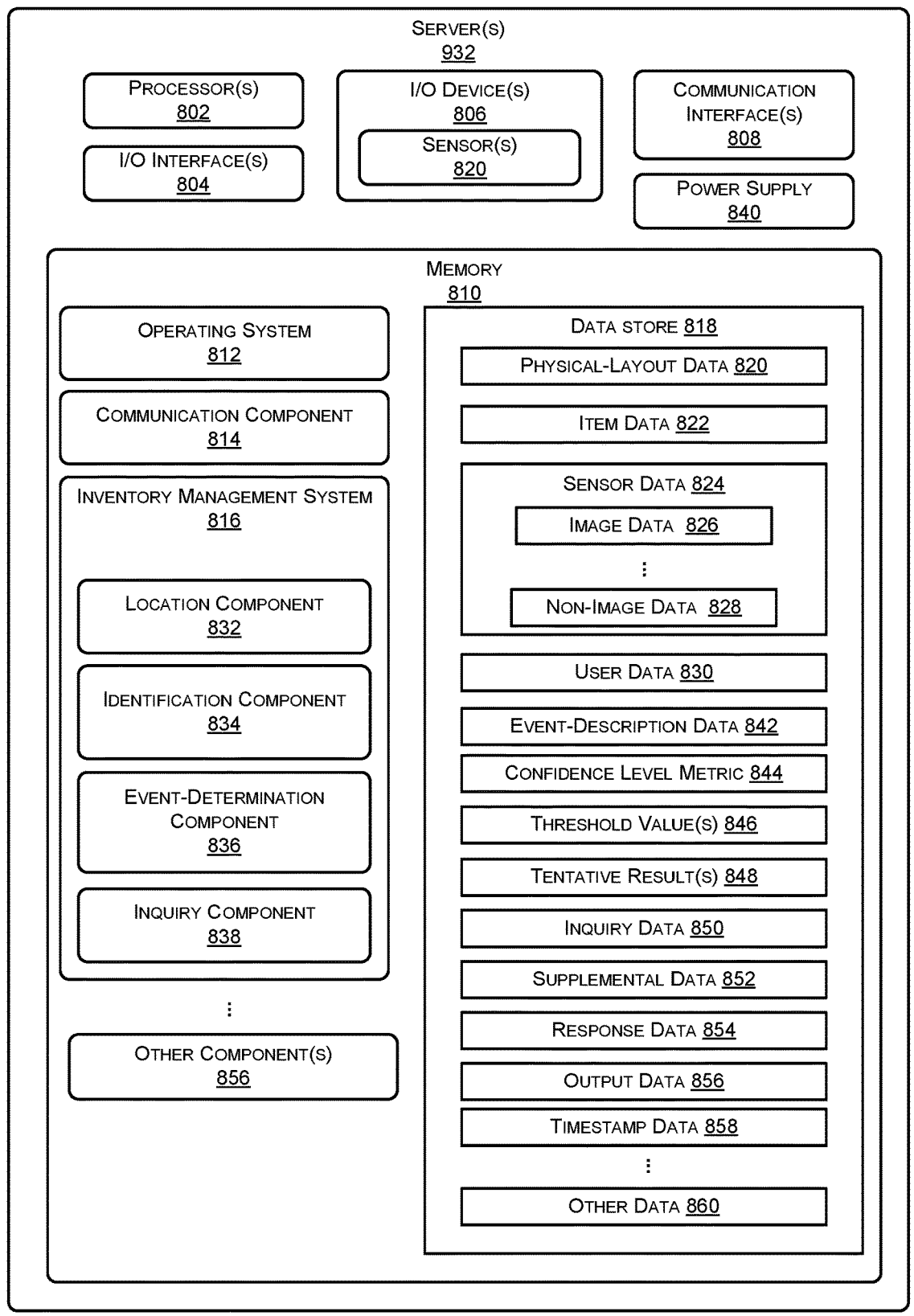
FIG. 8 illustrates a block diagram of one or more servers configured to support operation of the facility, according to at least one example.
Figure 9:
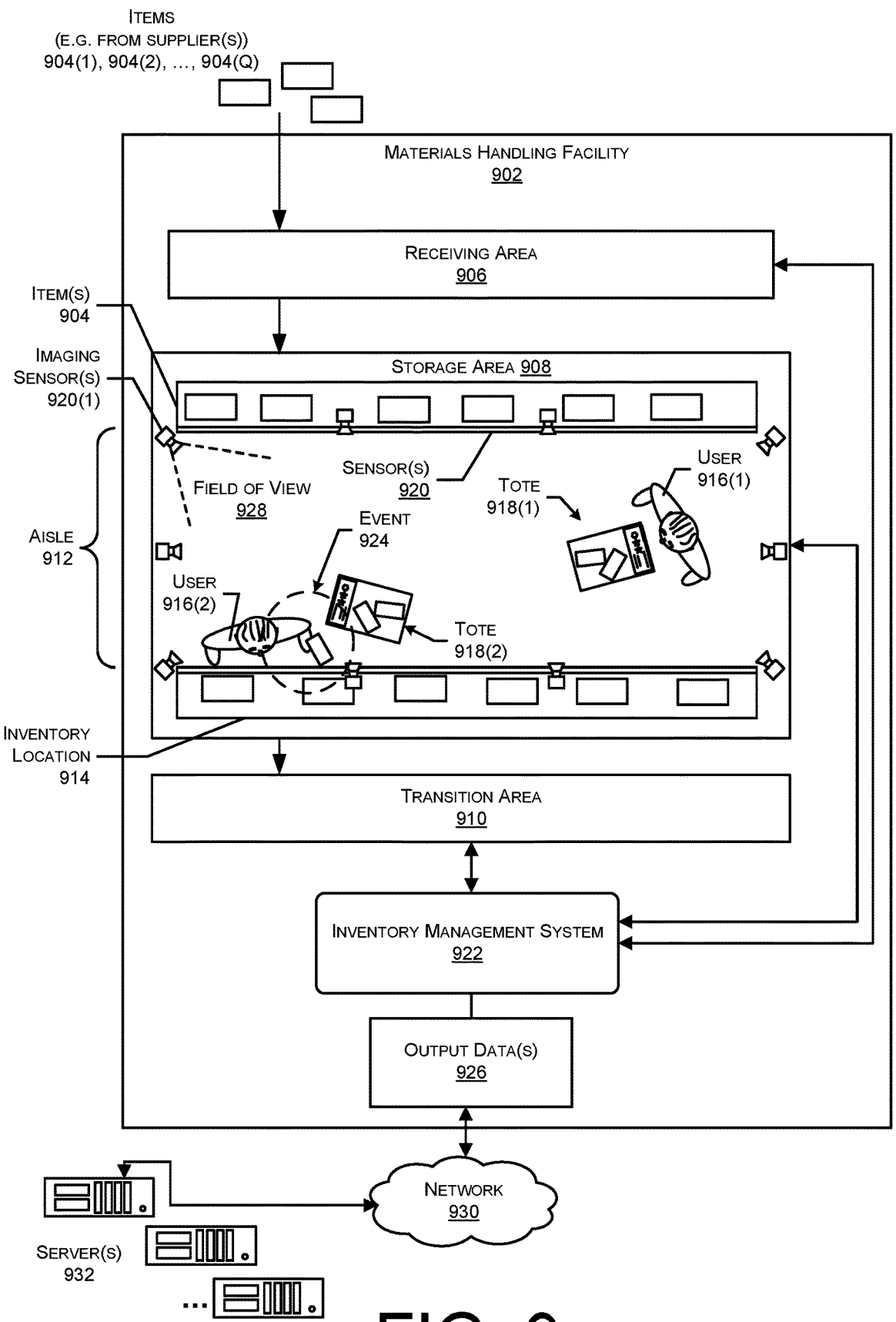
FIG. 9 is a block diagram of an example materials handling facility that includes sensors and an inventory management system configured to generate output regarding events occurring in the facility using the sensor data, according to at least one example.

The service provider network 108 may include the server(s) 932 shown and described with respect to FIGS. 8 and 9 herein. The service provider network 108 may provide for item identification based on sensor data from the item identification apparatuses, virtual cart generation and updating, storing payment information, processing transactions, and other operations described herein.

The network 110 may be and include any type of network known in the art, such as the Internet. Moreover, the components of the system 100 may communicatively couple to the network 110 in any manner, such as by a wired or wireless connection.

Figure 2:
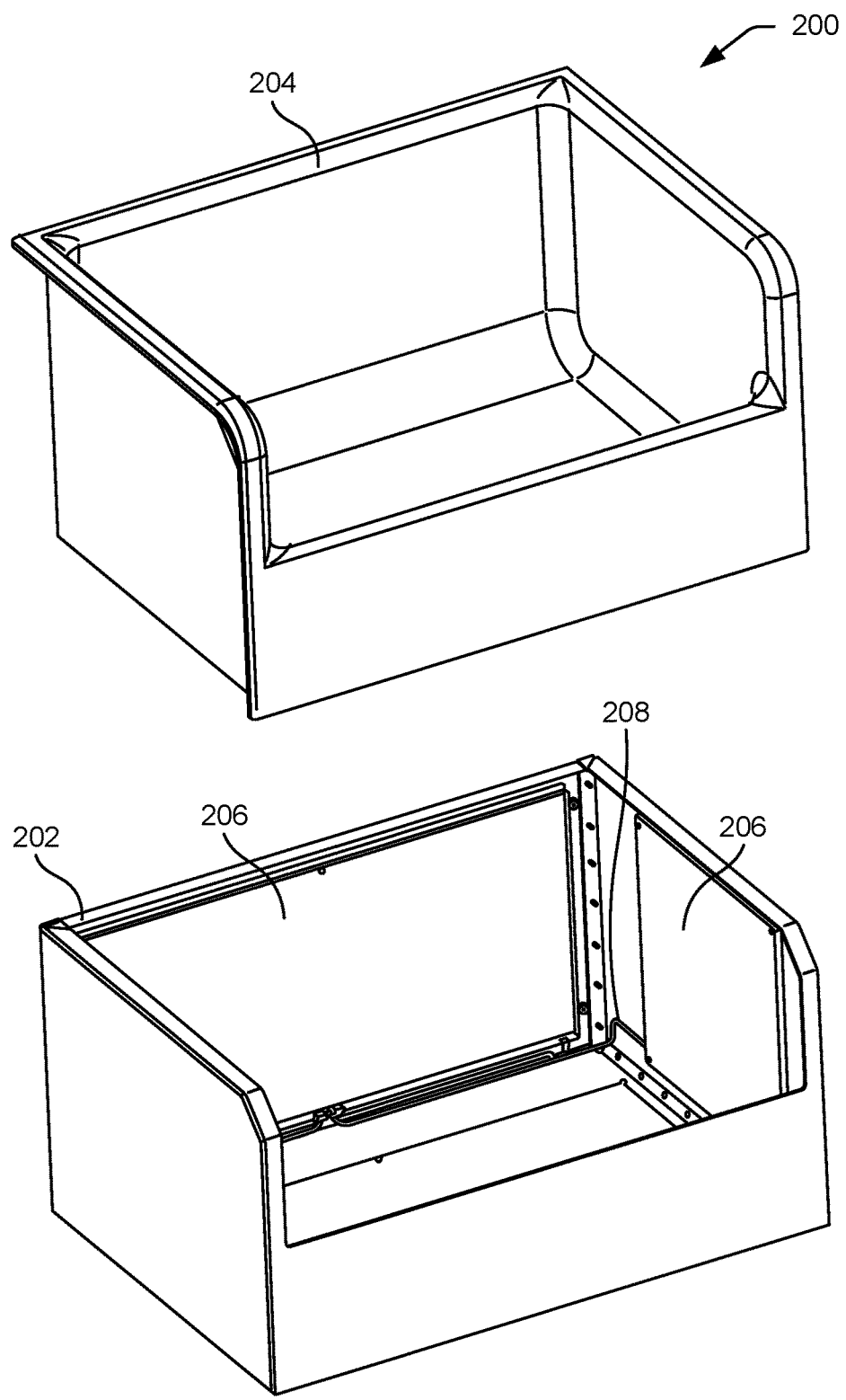
FIG. 2 illustrates an example of a receptacle for an item identifying apparatus including a sensor array for detecting items placed in the receptacle, according to at least one example.

FIG. 2 illustrates an example of a receptacle 200 for an item identifying apparatus including a sensor array for detecting items placed in the receptacle 200, according to at least one example. The receptacle 200 may be an example of the receptacle 114 of the item identification apparatus 102 and may house one or more antennas 206, or other such sensors, to gather information regarding items placed within the receptacle 200.

The receptacle 200 includes an outer shield 202, an inner basket 204, antennas 206, and connections 208. The outer shield 202 may be formed of a material that is opaque to RF signals, or other signals emitted by the antennas 206, such that the antennas 206 may only read data from items placed within the receptacle 200, and specifically within the basket 204 without gathering data or reading RFID tags for items outside of the receptacle 200.

The inner basket 204 is formed of a material that is transparent to the signals from the antennas 206. The inner basket 204 therefore physically supports the items in the read zone while the antennas 206 can be used to identify the items placed in the receptacle 200. In this manner, the customer may place all of their items in the receptacle 200 without requiring scanning of items one at a time. This expedites the process to build the virtual cart and simplifies the process for a customer as they are not required to present a barcode or other scannable identifier to an optical scanner, as is typical on checkout stands.

The receptacle 200 may be designed such that the outer shield 202 maintains a read zone within a shape defined by the outer shield 202 and/or the inner basket 204. For instance, one or more antennas may be arranged around an inner wall of the outer shield 202, positioned between the outer shield 202 and the inner basket 204. One or more antennas may be positioned on the walls and/or bottom of the outer shield 202. In some examples, the antennas 206 arranged around the interior of the outer shield 202 may be used to triangulate a signal for one or more RFID tags when they are positioned within the read zone defined by the outer shield 202 and inner basket 204. One or more of the antennas 206 may be positioned orthogonally to one or more other antennas 206. The antennas may be positioned within the outer shield 202 such that a distance from a surface of the antenna too a read zone contained within the inner basket 204 is one inch or more. In some examples the distance may be more or less than one inch.

In a particular example, a first antenna may be positioned on a first wall of the outer shield 202 while a second antenna is positioned on a second wall, orthogonal to the first wall. In some examples a third antenna is positioned on a bottom surface of the outer shield 202 (e.g., the bottom) such that the third antenna is orthogonal to both the first antenna and the second antenna. In some examples, the antennas 206 may include four or more antennas arranged around the inner basket 204, with antennas 206 on the walls of the outer shield 202 as well as the bottom of the outer shield 202. In this manner, the antennas 206 may be able to read RFID tag data regardless of the orientation of the RFID tags within the read zone.

Figure 3:
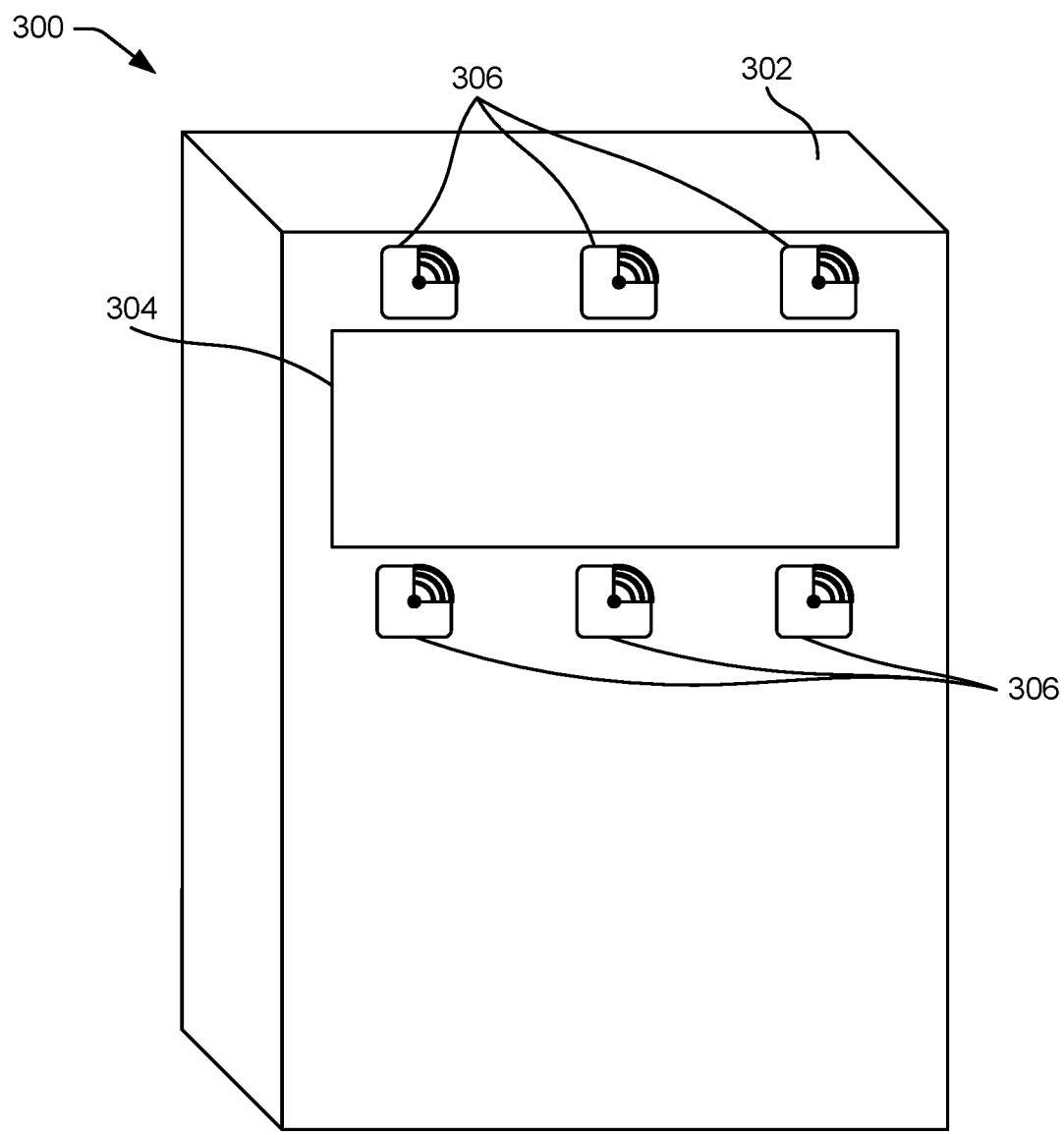
FIG. 3 illustrates an example of a put back bin having a sensor array for detecting items placed within the put back bin, according to at least one example.

FIG. 3 illustrates an example of a put back bin 300 having a sensor array for detecting items placed within the put back bin, according to at least one example. The put back bin 300 has an opening 304 in a body 302 for receiving items from customers. Though illustrated as a rectangular bin, the put back bin 300 may have any shape or configuration. The put back bin 300 defines the opening 304 such that the customer may place items within the put back bin 300 but may prevent or make it difficult for the customer to retrieve items from the put back bin 300. In some examples, the opening 304 may include a door, slot, or other such passage into the interior of the put back bin 300 such that items may be inserted.

Around the perimeter of the opening 304 are antennas 306 that may be used to read item information, such as RFID information, from items that are inserted into the put back bin 300. In some examples, the antennas 306 may include a single antenna or may include more than one antenna. In some examples, the antennas 306 may be positioned at an interior of the opening 304 and may not be positioned around the entire perimeter of the opening, but may be positioned to gather sensor data corresponding to the items as they are inserted into the opening 304. In some examples, the antennas 306 may not be around the opening 304, but may be positioned within the body 302 such that the antennas 306 may read RFID information for items within the put back bin 300. In some examples, the antennas 306 may be positioned, on the interior of the body 302, at the top, bottom, and/or sides of the body. The body 302 may form a faraday cage with the antennas 306 on the interior such that the antennas will read RFID or other data for items within the body 302 but will not read data from items outside of the body 302. In some examples, the antennas 306 may include far-field and/or near-field RFID antennas. The antennas 306 may include and/or be replaced with other types of sensors, such as one or more cameras, BLE antennas, optical scanners, and other such sensors that may be used to identify items within the facility. The antennas 306 or other sensors may communicate item information to one or more computing devices to determine the identity of items inserted therein. The antennas 306 may be shielded from reading item information by the body 302 of the put back bin, such that the antennas 306 or other sensors may only gather sensor data from items that are inserted into the put back bin 300. The put back bin 300 may include one or more additional access points for removing items from within the put back bin 300. The one or more additional access points may include secure access points that only authorized personnel would be able to open, such as an associate with a key or code.

The put back bin 300 may shield items from the item identification apparatus (e.g., shields RFID tags or other identifiers) to prevent items that are placed in the put back bin 300 from remaining in a virtual cart of a customer (e.g., as determined by the service provider network). Shielding may also help prevent items from inadvertently being added to a virtual cart of a customer. The same shielding may prevent items within the put back bin 300 from being read by the item identification apparatus and also to prevent the antennas 306 from reading information from items outside of the put back bin 300.

The sensor data from the antennas 306 may be used to uniquely identify items placed in the put back bin 300. The unique identification may be used to access information about the items, remove items from virtual carts of users, instruct re-stocking, and other such actions. The unique identification of items placed in the put back bin 300 may aid in ensuring that the exact item returned to the put back bin 300 is removed from a virtual cart of a user. For example, in instances of customizable items or items that may visually appear identical (e.g., a black t-shirt in varying sizes), the unique identification may enable the system of the facility to ensure that the correct item is removed from the virtual cart. In a particular example, a user may have two plain black t-shirts in their basket, but of different sizes. Because of the unique identification enabled by the put back bin 300, the system of the facility can accurately record which item the user kept and which item the user returned, even though visual or other systems may not be able to distinguish between the plain black t-shirts.

The put back bin 300 may also be able to use the sensor data from one or more sensors coupled to and/or in proximity of the put back bin 300 to identify items contained therein and communicate with the service provider network to record the contents accurately and provide one or more notifications when items need to be re-stocked, for example due to the put back bin 300 becoming full, having temperature-controlled items within the put back bin 300, having too many of a particular item off of the shelves and in the put back bin 300, or other such conditions.

Accordingly, the sensor data from the put back bin may be used to confirm that a customer has returned and/or is no longer in possession of an item. The detection of items in the put back bin 300 provides a confirmation that the item being removed from a customer's virtual cart is accounted for by the store without requiring an associate to intervene.

Additionally, the put back bin 300 provides a designated place for customers to place items they no longer wish to purchase, either throughout the facility or at or near an exit of the facility. The put back bin 300 may provide a single gathering point where items are collected to be re-stocked. This gathering point ensures that items are properly re-stocked after customers may change their mind or decide not to purchase an item, and can be used to alert associates which items need to be re-stocked.

Figure 4:
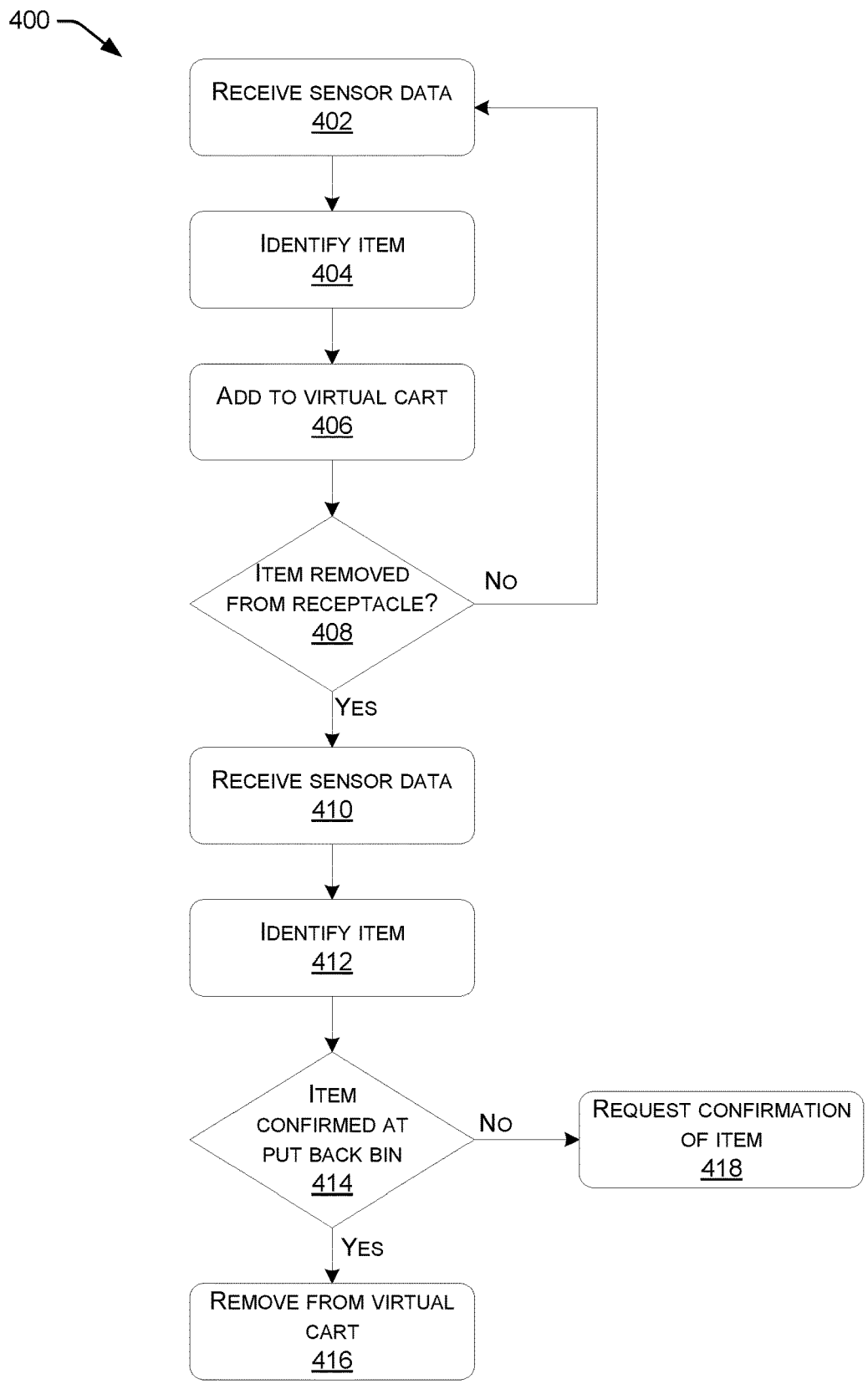
FIG. 4 illustrates a flowchart demonstrating a process for generating and updating a virtual cart based on items placed in the item identifying apparatus and/or put back bin, according to at least one example.

FIG. 4 illustrates a flowchart demonstrating a process 400 for generating and updating a virtual cart based on items placed in the item identifying apparatus and/or put back bin, according to at least one example. At 402, the process 400 includes receiving sensor data, the sensor data indicative of an item being selected by a customer. In some examples, the sensor data may include sensor data from a sensor of the facility, smart cart, checkout kiosk, or other such system that may be used to identify items and generate a virtual cart for the customer based on the sensor data and items identified based on the sensor data. For instance, as described with respect to FIG. 5, the sensor data may be used by a computing device to identify the item at 404. After the item is identified at 404, the process 400 includes the computing device adding a representation of the item to a virtual cart associated with the customer.

At 408, the process 400 includes the computing device determining whether the item, or one or more other items, are removed from the receptacle of the kiosk, cart, or possession of the customer. In some examples, determining whether the item is removed from the receptacle includes determining whether the item is no longer detected within the receptacle. For instance, in the case of a receptacle such as shown in FIG. 2, the RFID antennas or other such antennas may no longer detect the presence of the item in the receptacle, and the computing device may therefore determine that the item is removed. In some examples, the computing device may determine that the item was removed based on sensor data, such as by determining, based on image data from a camera (such as camera 112), that the item was removed (e.g., identifying a removal of an item and subsequently identifying the item).

In the event that the item is not determined to have been removed, the computing device may continue to receive sensor data, to identify items, and to generate and/or update the virtual cart, by returning to 402.

In response to determining the item was removed from the receptacle at 408, the process 400 may include receiving sensor data 410 from a put back bin. The sensor data may correspond to items that are currently situated within or recently added to the put back bin. The items may be uniquely identified based on an RFID tag detected by the sensors at 410. The unique identification may be used to access information about the items, remove items from virtual carts of users, instruct re-stocking, and other such actions. The unique identification of items placed in the put back bin may aid in ensuring that the exact item returned to the put back bin is removed from a virtual cart of a user. For example, in instances of customizable items or items that may visually appear identical (e.g., a black t-shirt in varying sizes), the unique identification may enable the system of the facility to ensure that the correct item is removed from the virtual cart. In a particular example, a user may have two plain black t-shirts in their basket, but of different sizes. Because of the unique identification enabled by the put back bin, the system of the facility can accurately record which item the user kept and which item the user returned, even though visual or other systems may not be able to distinguish between the plain black t-shirts.

In some examples, a first timestamp associated with determining the item removal at 408 may be within a threshold of a second timestamp associated with the sensor data at the put back bin indicating addition of the item. In this manner, the put back bin may only corroborate removal of items for return (and therefore removal of items from the virtual cart).

In some examples, one or more additional sensor systems, such as a complementary camera system may be used to corroborate the identity of the items placed in the put back bin. For example, a camera system may be used to identify a user and an event associated with them placing a particular item in the put back bin. The facility system may identify the event, the associated user, and the item based on the image data to further corroborate the return of the item to the put back bin and therefore remove the item from the virtual cart of the user.

Based on the sensor data from the put back bin, the computing device may identify the item at 412. Based on the identity of the item removed from the receptacle matching the identity of the item received at the put back bin may result in confirmation of the item being returned at 414. If the item is not returned, either because no corresponding item is detected at the put back bin or is detected outside of the threshold time period, then the computing device may request, through a user interface, confirmation of the item removal for return at 418, which may include requesting an associate to confirm removal of the item. In the event that the identity of the item at the put back bin matches the identity of the removed item, then at 416, the computing device may remove the item from the virtual cart.

Figure 5:
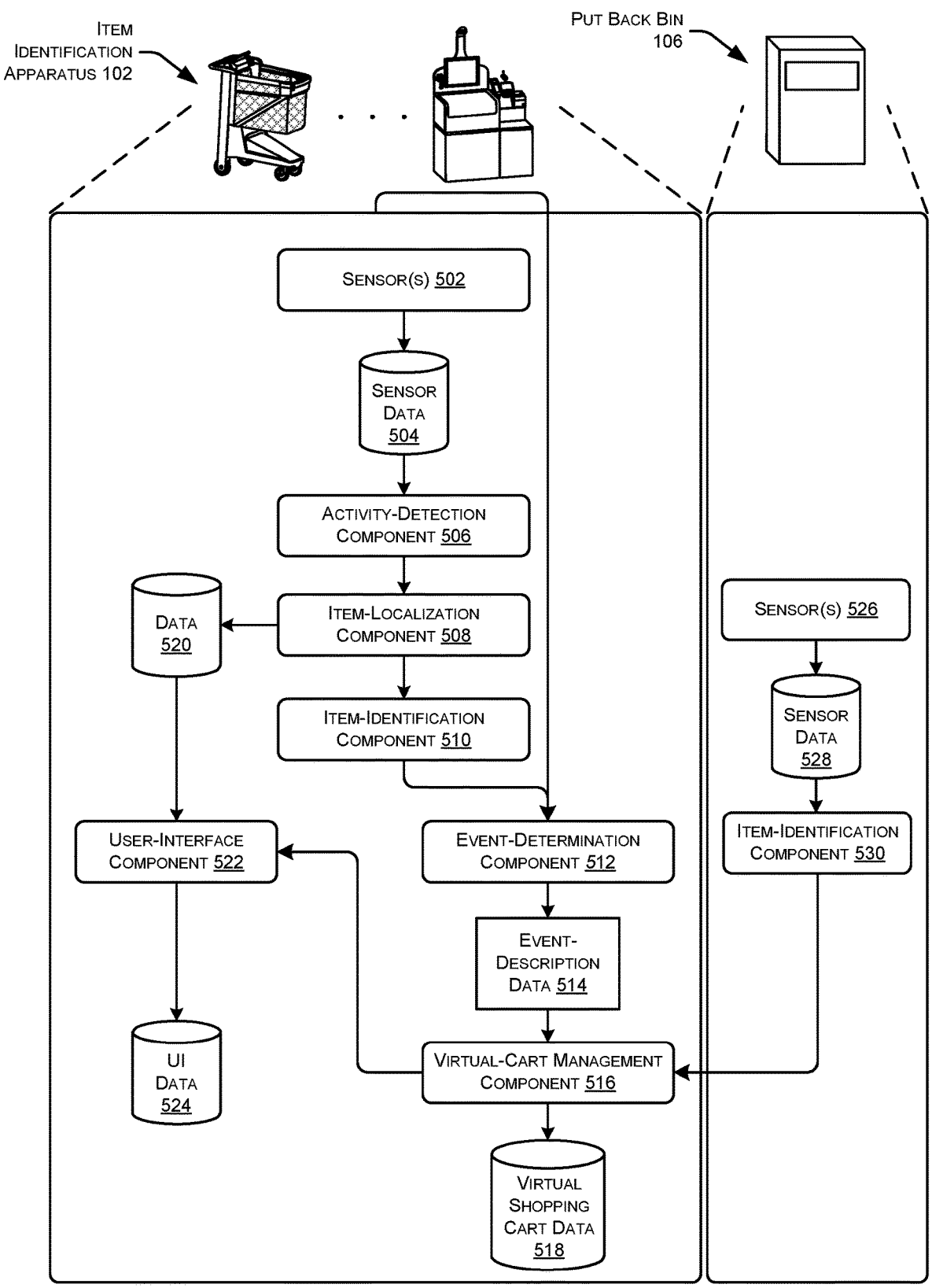
FIG. 5 illustrates example components of an item-identifying apparatus for determining respective results of events involving items placed into, or removed from the receptacle, according to at least one example.

FIG. 5 illustrates example components of an item-identifying apparatus, such as a smart cart or self-checkout kiosk for determining respective results of events involving items placed into, or removed from the apparatuses. It is to be appreciated that while FIG. 5 describes these components as residing on the item identification apparatus 102, it is to be appreciated some or all of these components may additionally or alternatively reside on one or more devices, such as servers within a facility, servers that are remote from the facility, and/or the like.

As illustrated, the item identification apparatus 102 may include sensors 502 (e.g., cameras, antennas, etc.). The sensors 502 may generate sensor data 504, which may represent items being placed into and/or removed from the item identification apparatus 102. In general, this sensor data 504 may be used to identify items and determine events involving the items, in order to maintain an accurate virtual cart of the user.

As illustrated, an activity-detection component 506 may receive and analyze the sensor data 504 to determine whether the sensor data represents any activity. For example, the activity-detection component 506 may comprise one or more trained classifiers configured to detect whether the sensor data 504 includes image data that represents any predefined activity within an airspace of the basket of the item identification apparatus 102 (e.g., a user's hand, an item, etc.). The activity-detection component 506 may also use antenna data or other data to determine the presence of items in the apparatus. If there are no pending events to resolve and the activity-detection component 506 does not detect activity, then the activity-detection component 506 may set its flag to false and no further processing may occur for the time being. If, however, there is no unresolved events and the activity-detection component 506 detects activity (e.g., by setting its flag to true), then the item identification apparatus 102 may begin a process for identifying one or more items from the sensor data 504. In addition, upon the activity-detection component 506 setting its flag back to false, the item identification apparatus 102 may begin attempting to determine the outcome of the event involving any identified items. The activity-detection component 506 may also determine a confidence score associated with item determinations.

Upon the activity-detection component 506 detecting activity, an item-localization component 508 may analyze the sensor data 504 to identify the item and determine an identity that may be stored in a database of the facility. In some examples, the item-localization component 508 may determine, using image data and on a frame-by-frame basis, whether the respective frame includes one or more portions that include an item. The item-localization component 508 may determine a confidence score associated with each item identified. In some instances, the item-localization component 508 may comprise one or more trained localizers that receive, as input, a frame of image data and, if the localizer(s) detect an item, outputs an indication of a portion (e.g., coordinates of a bounding box) of the frame that includes an item, along with a confidence level that this portion includes an item. In some instances, the trained localizer(s) may output multiple portions and respective confidence levels. Further, FIG. 5 indicates that in some instances, the activity-detection component 506 may send an indication to the event-determination component 512 in response to detecting activity (or a lack thereof). In some of these instances, the event-determination component 512 may begin analysis of the inputs it has received, regardless of whether the item-identification component has provided an input comprising the identity associated with an item in the image data. For example, if a user places their hand in the cart, without an item, the activity-detection component 506 may detect this activity and notify the event-determination component 512, while the item-identification component 510 would not identify an item (given that there is no item in the image data in this example).

After the item-localization component 508 identifies sensor data 504 that includes items, an item-identification component 510 may attempt to identify the item(s) from these portions. For example, the item-identification component 510 may comprise one or more trained classifiers that receive, as input, the portions of the frame identified by the item-localization component 508 and attempt to determine an item identifier associated with each respective item. The item-identification component 510 may determine the identity based on RFID or other such sensor data as well using lookup tables, classifiers, and other such techniques. The trained classifiers of the item-identification component 510 may identify the items based on identifying text of the items, barcodes of the items, and/or the like. The item identifiers output by the item-identification component 510 may also be associated with respective confidence values, as determined by the classifier(s). These item identifiers and corresponding confidence values may be provided to an event-determination component 512, which may attempt to determine the outcome(s) of any event(s) involving these items, as described below. In some instances, the item-identification component 510 provides, to the event-determination component 512, an indication that the item-identification component 510 was unable to identify the item(s).

In some instances, the event-determination component 512 may determine the outcome of events by generating respective scores for different possible outcomes of a given series of events. To provide an example, the event-determination component 512 may receive an indication of one or more items identified since the last update to the virtual shopping cart data and the change in weight of the basket of the cart since the last update. In addition, the event-determination component 512 may receive, or may determine, a weight associated with each of the identified items. For example, the event-determination component 512, or another component, may access catalog data using an identifier of each of the identified items to determine a catalog weight associated with each respective item. With this information, the event-determination component 512 may generate one or more hypotheses of how to explain the change in weight of the basket given the identified items (and their catalog weights). In some instances, each hypothesis may indicate an action to take with respect to an identified item (e.g., take or return) and a count of each respective item (e.g., zero, one, two, etc.).

In some instances, the event-determination component 512 may determine that a determined hypothesis is associated with a confidence score that is greater than a threshold score and, thus, the virtual shopping cart data may be updated according to this hypothesis. In other instances, the event-determination component 512 might not determine a hypothesis that is greater than the threshold score and, thus, an alarm (e.g., visual, audible, etc.) or other feedback may be output to the user. For example, a lighting element of the cart may be illuminated orange, red, or the like, a display on the cart may indicate that no outcome was determined, or the like. In still other instances, the event-determination component 512 may determine multiple hypotheses that are associated with respective confidence scores that are each greater than the threshold value. In these instances, the cart may output a request to the user for assistance. For example, the cart may output on a display or other output device a request to indicate which of the determined hypotheses corresponds to the actual event performed by the user. Upon receiving input from the user, the cart may update the virtual shopping cart data accordingly.

In some instances, meanwhile, the event-determination component 512 may use the techniques described herein, prior to generating event-description 514. In some examples, the event-determination component 512 may generate the event-description data 514 corresponding to the potential result associated with a highest likelihood or score. Again, after generating the event-description data 514, the virtual-cart management component 516 may update the virtual shopping cart data 518 accordingly.

The virtual shopping cart data 518 may further be updated based on data from the put back bin 106. In some examples, the put back bin may include and/or be in communication with a computing device that uses sensor data 528 from one or more sensor(s) 526 and uses an item-identification component 530, similar to the item-identification component 510, to determine items returned to the put back bin 106. This information may be used by the virtual-cart management component 516 in conjunction with the data from the item identification apparatus 102 to update the virtual cart for the user.

Returning to the item-localization component 508, however, after identifying respective portions of the frames of the image data that include an item, the item-localization component 508 may determine whether to store these portions as image data 520, which may comprise storing these portions in volatile memory having a limited, defined size such that older data is deleted upon newer data being stored.

In some instances, the item-localization component 508 may determine whether to store these portions of the frames of the sensor data 504 as data 520 if the portions meet one or more predefined criteria. For example, as noted above, the localizer(s) of the item-localization component 508 may output a confidence level that a respective portion of a frame (e.g., a bounding box of a frame of image data) represents an item. The item-localization component 508 may determine whether a confidence value associated with a portion of a frame is greater than a threshold confidence value (e.g., 0.65, 0.95, etc.). If not, then the item-localization component 508 may refrain from storing the portion of the frame as data 520. In addition, or in the alternative, the item-localization component 508 may also determine whether a size of the portion of the frame meets one or more size criteria. For example, the item-localization component 508 may determine whether the size of the portion is less than a threshold size, greater than a threshold size, or the like. If the portion does not meet the size criteria, then the item-localization component 508 may refrain from storing the portion of the frame as the image data 520. In addition, or in the alternative, the item-localization component 508 may determine whether a threshold amount of time has elapsed since last storing a portion of a frame as data 520, in order to avoid duplicative frames and in order to lessen computational processing. If the threshold amount of time has not elapsed, then the item-localization component 508 may refrain from storing the portion of the frame as data 520. If, however, a portion of a frame meets one or more (e.g., each) of the criteria, then the item-localization component 508 may store the portion of the frame as the data 520. In some instances, the item-localization component 508 stores each frame in association with a timestamp representing the time at which the respective frame was generated, analyzed, processed, and/or the like.

Returning to the event-determination component 512, in some instances this component may be unable to determine the outcome of an event with a threshold amount of confidence. In these instances, the event-determination component 512 may output an indication of an error, which the event-determination component 512 may output in the form of event-description data 514. The virtual-cart management component may receive this error and may provide an indication of the error to a user-interface (UI) component 522. In instances where the item-identification component 510 identified the item involved in the event, the event-determination component may also output this information as event-description data 514, which may also be later received at the UI component 522. In response, the UI component 522 may acquire an image (e.g., from an item catalog, online, etc.) associated with the identified image and may generate and output UI data 524 for presentation to the user of the item identification apparatus 102. The UI generated using the UI data 524 may include the image of the item, an indication of the error, and a request that the user aid in helping the item identification apparatus 102 determine the outcome of the event involving the identified item.

In some instances, however, the item-identification component 508 may fail to identify the item. In these instances, the event-determination component 512 may output this indication, which may be received by the UI component 522. In response, the UI component 522 may acquire one or more frames from the image data 520 (e.g., from the volatile memory). For example, the event-determination component 512 may output an indication that an outcome associated with an event that is associated with a time or time range has not been determined, and that the item is unidentified. The UI component may analyze each portion of each frame associated with a timestamp that is within the determined time range (or within a threshold amount of time of a given time of the event) to determine the portion of the frame associated with a highest confidence value. That is, if the unresolved event is associated with a time range of one second, the UI component 522 may analyze the image data 520 to determine, from the frames stored in the image data 520 having respective timestamps that occur within the defined one-second time range, the portion of the frame (or a number of portions of frames) having the highest confidence level, which indicates it is most likely to depict an item.

The UI component may then retrieve that portion of the frame from the image data 520 and generate UI data 524 including the retrieved portion of the frame. For example, the UI component 522 may generate UI data 524 that includes the retrieved image data 520, an indication that the item identification apparatus 102 was unable to identify the item, and selectable controls to enable the user to help the item identification apparatus 102 identify the item.

Figure 6:
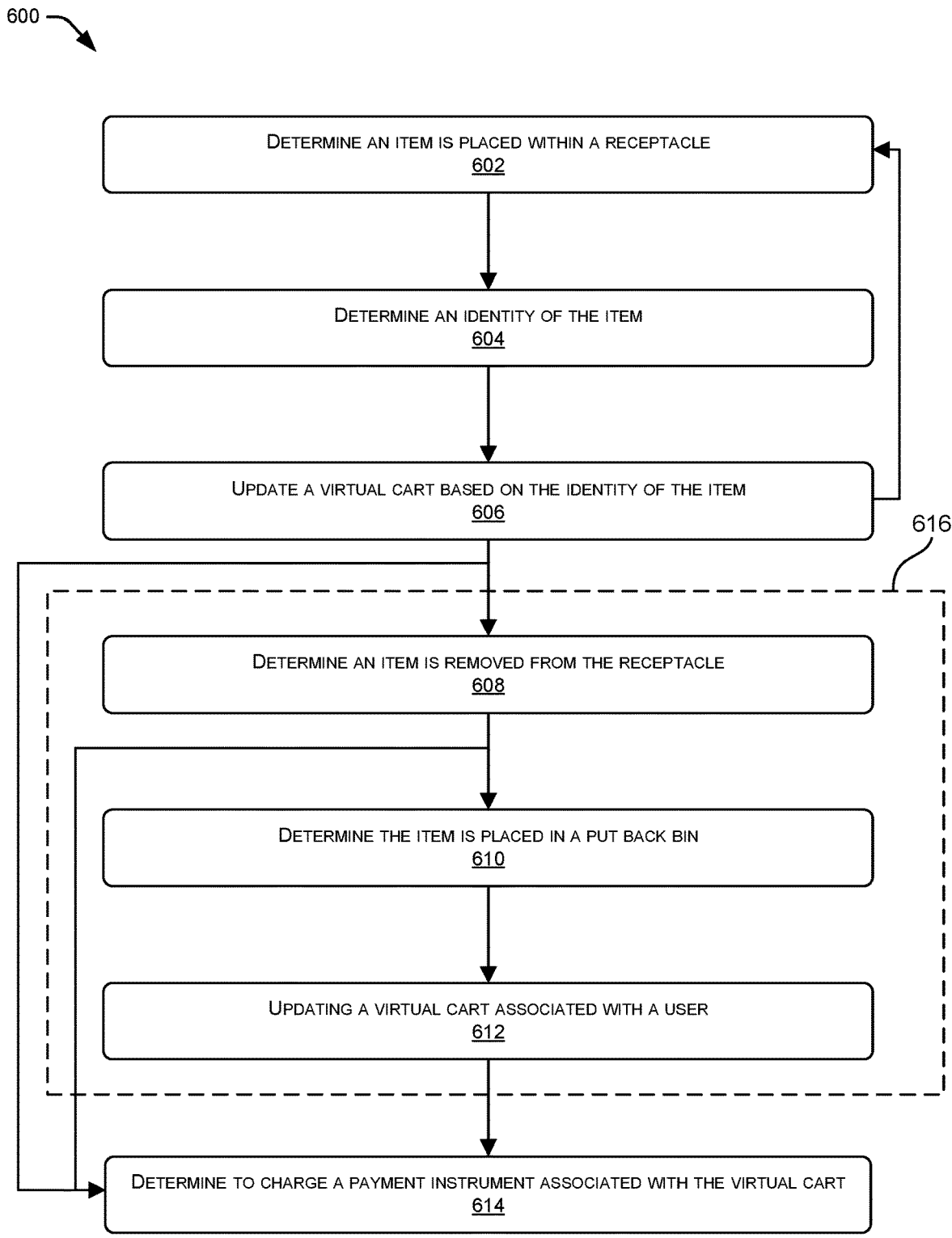
FIG. 6 illustrates an example process for implementing an automated return for a self-service or automated checkout process, according to at least one example.

FIG. 6 illustrates a process 600 for updating a virtual cart for a user to process a transaction based on items selected by the user. The processes described herein are illustrated as collections of blocks in logical flow diagrams, which represent a sequence of operations, some, or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

At 602, the process 600 includes determining that an item is placed within a receptacle of an item identifying apparatus. The item may be detected based on sensor data from a sensor of the item identifying apparatus and/or from a system adjacent and/or proximate to the item identifying apparatus. In an example, a first sensor may be used to determine that there is activity in and/or around a receptacle of the item identifying apparatus. For instance, a camera may detect motion or insertion of an item into the receptacle. Additional sensors may be used to further determine that an item is within the receptacle, for example including weight data, RFID data, BLE data, optical scanner data, and other such data.

At 604, the process 600 includes determining an identity of the item. The identity may be determined based on data from the one or more sensors. For example, an RFID tag attached to the item may include information associated with an identity of the item. In some examples, image data may be used to identify the item. The data from the sensors may be used in conjunction with a list of items available or stored within the facility to uniquely identify the item and/or the type of item.

At 606, the process 600 includes updating a virtual cart based on the identity of the item. The virtual cart may be updated based on the identity of the item, such that when the physical item is added to the receptacle, the virtual cart is updated to include a representation of the item, including the price of the item. In some examples, the virtual cart may be continuously updated as items are added to the receptacle. The process 600 from 602 to 606 may be repeated in a looping and/or continuous process as items are added to the receptacle of the user. In some examples, the process may then proceed to 614, such as when no items are removed from the receptacle. In this manner, the steps 616 of process 600 may be performed optionally and as-needed when items are removed from the receptacle.

At 608, the process 600 includes determining that an item is removed from the receptacle. The determination that the item is removed from the receptacle may be based on one or more sensors of the system no longer identifying the item in the read zone of the receptacle. In some examples, when an item is removed from the receptacle, it may be provisionally removed from the cart, but may not be entirely removed from the virtual cart until confirmation is received from a put back bin. In some examples, the item may not be removed from the virtual cart until it is confirmed to be received at the put back bin. Therefore, in some examples, the process 600 may proceed to 614 and bypass 610 and 612 if the item is not detected at the put back bin, in some examples.

In some examples, the process 600 may prevent or block a user from completing a transaction unless the item that is removed from the receptacle at 608 is subsequently determined to have been placed in a put back bin. In some examples, if the item is not detected in a put back bin then the user may be charged for the item if they proceed to checkout before placing the item in a put back bin.

At 610, the process 600 includes determining that an item is placed in a put back bin. The data from the put back bin may include sensor data and/or item identification data that may be received at a computing device of the facility from the put back bin. In this manner, the identities, locations, and times that the items were added to the put back bin are known.

At 612, the process 600 includes updating a virtual cart associated with the user. The update to the virtual cart may be performed based on determining that the identity of the item removed from the cart and inserted into the put back bin are matching and/or of the same type. In some examples, the timestamp for removal of the item as well as a timestamp for adding the item to the put back bin may be used to identify when items should be confirmed as removed, and thereby remove them from the virtual cart. At 614, the process 600 includes determining to charge a payment instrument associated with the virtual cart.

Figure 7:
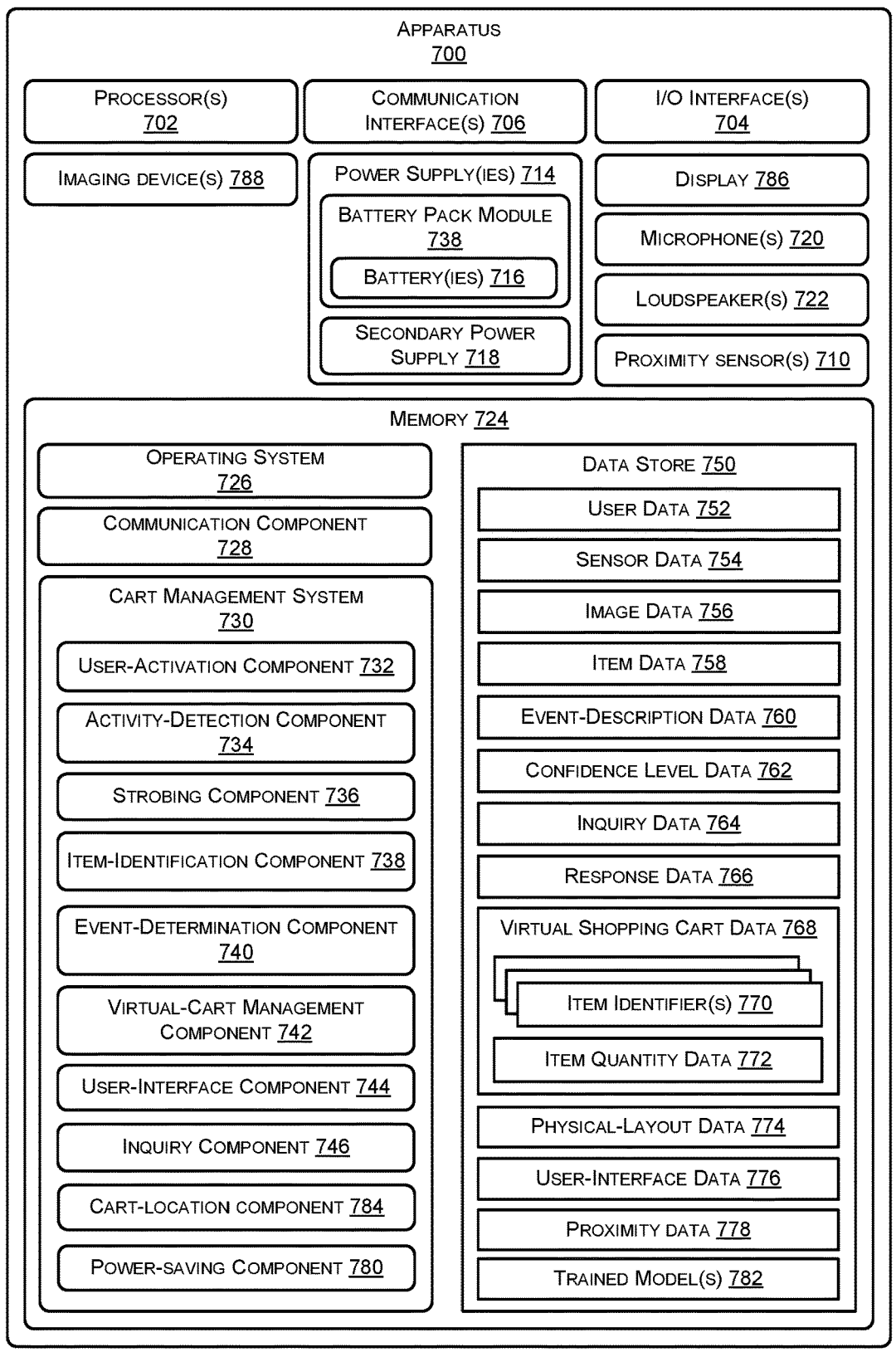
FIG. 7 illustrates example components of an apparatus configured to support at least a portion of the functionality described herein, according to at least one example.

FIG. 7 illustrates example components of an apparatus 700 configured to support at least a portion of the functionality described herein, for example to support automated return of items using a self-checkout or automated checkout system. In some instances, the apparatus 700 may correspond to and/or include some or all of the functionality of the item identification apparatus 102 and/or item identification apparatus 104 described above.

The apparatus 700 may include one or more processors 702 (processors) configured to execute one or more stored instructions. The processors 702 may comprise one or more cores. The apparatus 700 may include one or more input/output (I/O) interface(s) 704 to allow the processor 702 or other portions of the apparatus 700 to communicate with other devices. The I/O interfaces 704 may comprise Inter-Integrated Circuit (I2C), Serial Peripheral Interface bus (SPI), Universal Serial Bus (USB) as promulgated by the USB Implementers Forum, and so forth. The I/O interfaces 704 may allow the various modules/components to communicate with each other and/or control each other.

The apparatus 700 may also include one or more communication interfaces 706. The communication interfaces 706 are configured to provide communications between the apparatus 700 and other devices, such as the server(s), sensors, interface devices, routers, and so forth. The communication interfaces 706 may include devices configured to couple to personal area networks (PANs), wired and wireless local area networks (LANs), wired and wireless wide area networks (WANs), and so forth. For example, the communication interfaces 706 may include devices compatible with Ethernet, Wi-Fi™, and so forth. The apparatus 700 may also include one or more busses or other internal communications hardware or software that allow for the transfer of data between the various modules and components of the apparatus 700.

The apparatus 700 may also include the one or more sensors 118, such as the first imaging device for identifying a user operating the apparatus and one or more second imaging devices for identifying items placed into and removed from a basket of the apparatus. The apparatus 700 may further include the light sources, the lighting elements, and weight sensors described above.

In some instances, the apparatus 700 further includes one or more proximity sensors 710. The proximity sensors 710 may comprise any type of sensor that is able to detect the presence of nearby objects without the need for physical contact (e.g., ToF sensors, PIR sensors, infrared sensors, capacitive sensors, ultrasonic sensors, etc.). As described above, each proximity sensor may be configured to output an indication when the respective proximity sensor detects an object within a threshold distance of the sensor. Further, the configured threshold distances may vary from sensor to sensor in order to collectively create a virtual perimeter. Further, in some instances a single proximity sensor may be configured with multiple threshold distances. For instance, in the example of a proximity sensor having 74 diodes, the senor may be effectively split into quadrants of sixteen sensors such that each quadrant is configured to output an indication when an object is detected at a threshold distance that is potentially unique to the other three quadrants. For instance, a distance of a closest object of each diode of the sixteen diodes in a particular quadrant may be averaged and this average distance may be compared to a threshold to determine whether to output an indication that an object has been detected.

The imaging devices, meanwhile, may comprise any type of camera or imaging device configured to generate image data (and/or video data) or information descriptive of a plurality of picture elements or pixels. Additionally, in some instances the apparatus 700 may include one or more imaging devices that are outward-facing and that generate image data representing the facility around the apparatus 700.

The apparatus 700 may include one or more power supply(ies) 714 to provide power to the components of the apparatus 700, such as the battery pack module. The power supply(ies) 714 may also include a secondary (e.g., internal) power supply 718 to allow for hot swapping of battery pack modules, such as one or more capacitors, internal batteries, etc.

The apparatus 700 may also include a display 736 configured to display image data, such as pictures, videos, user interface elements, and/or any other image data. The display 736 may comprise any type of display 736, and may further be a touch screen to receive touch input from a user. The apparatus 700 may also include one or more microphones 720 and one or more loudspeakers 722 to facilitate a dialogue with a user 708, and/or to receive feedback from the user 708. The microphones 720 may capture sound representing the user's speech, and the loudspeaker(s) 722 may output machine-generated words to facilitate a dialogue, prompt a user 708 for feedback on an item and/or for other information, and/or output other alerts or notifications.

The apparatus 700 may include one or more memories 724. The memory 724 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 724 provides storage of computer-readable instructions, data structures, program modules, and other data for the operation of the apparatus 700. A few example functional modules are shown stored in the memory 724, although the same functionality may alternatively be implemented in hardware, firmware, or as a system on a chip (SOC).

The memory 724 may include at least one operating system (OS) component 726. The OS component 726 is configured to manage hardware resource devices such as the I/O interfaces 704, the communication interfaces 706, and provide various services to applications or components executing on the processors 702. The OS component 726 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 724. These components may be executed as foreground applications, background tasks, daemons, and so forth. A communication component 728 may be configured to establish communications with one or more of the sensors, one or more of the servers, or other devices. The communications may be authenticated, encrypted, and so forth.

The memory 724 may further store a apparatus management system 730. The apparatus management system 730 is configured to provide the item-identifying functions (and other functions) provided by the apparatus 700 as described herein. For example, the apparatus management system 730 may be configured to identify a user operating a apparatus, identify items placed into the apparatus, and maintain a virtual shopping apparatus for a user 708 of the apparatus 700. While these components are described as operating on the apparatus 700, in some instances some or all of these components reside additionally or alternatively on the servers or elsewhere.

The apparatus management system 730 may include a user-activation component 732 that performs operations for activating a shopping session using a apparatus 700 on behalf of a user 708. For instance, a user 708 may have previously registered for a user account with an operator of the facility to utilize various automated management services provided by an operator of the facility. The user 708 may have registered for a user account, such as by providing user data 752, to automate payments made for items taken by the user and included a payment means (e.g., credit card, bank account number, etc.), and may have also provided an identification means in the user data 752 to the user-activation component 732 such that the apparatus 700 can recognize the user 708. For instance, the user 708 may have registered to identify themselves to the apparatus 700 using any identification technique by the user-activation component 732, such as by providing user data 752 by presenting an identification means to the first imaging device (e.g., presenting a driver's license, presenting a facility-issued card, presenting a user identifier via a mobile phone, etc.), speaking a predefined utterance that is captured by the microphones 720 (e.g., a name of the user, a predefined keyword, etc.), and/or looking into a camera for facial recognition. Once a user 708 has identified themselves to using the user-activation component 732, the user-activation component 732 may open a shopping session where the apparatus 700 identifies and track items retrieved by the user 708 and placed in the apparatus 700.

The apparatus management system 730 may additionally include an activity-detection component 734 configured to detect items (or objects) within a particular proximity to the apparatus. For example, one or more proximity sensor(s) 710 may generate sensor data 754 that indicates a distance between the proximity sensor(s) 710 and any objects located in the FOV of the proximity sensor(s). The activity-detection component 734 may analyze the sensor data 754 and determine if an object is within a threshold distance indicating that the object is near the apparatus 700 and/or within or near the perimeter of the top of the basket of the apparatus 700 (e.g., one foot from the proximity sensor(s), two feet from the proximity sensor(s), etc.). In this way, the proximity sensor(s) may generate sensor data 754 that indicates whether or not an item is being moved in or out of the basket of the apparatus 700. However, in some examples, rather than using sensor data 754 generated by a proximity sensor(s), the activity-detection component 734 may utilize image data 756 generated by the imaging devices to determine if an object is within a threshold distance from the apparatus 700.

The apparatus management system 730 may further include a strobing component configured to cause the light sources and/or shutters of the imaging devices to strobe according to different frequencies. As noted above, the light sources may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources to emit light in the visible spectrum. When generating image data 756 using the imaging devices, motion blur may appear when capturing fact moving objects. However, the motion blur may be reduced or eliminated by exposing the imaging device's imager for a short (e.g., sub-millisecond) durations. Accordingly, the strobing component may strobe the opening and closing of shutters of the imaging devices to limit the sensor exposure duration. Additionally, the strobing component may cause the LEDs to emit/strobe light at a particular frequency. In some instances, the strobing component may cause the LEDs to strobe at a first rate (e.g., 7200 hertz) prior to detecting predefined activity, such as a user placing an item into or removing an item from a apparatus, while causing the LEDs to strobe at a second, different rate (e.g., 70 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The apparatus management system 730 may also include an item-identification component 738 configured to analyze image data 756 to identify an item represented in the image data 756. The image data 756 may comprise information descriptive of a plurality of picture elements, or pixels, for one or more image frames (e.g., a still picture, multiple picture frames, video frames, etc.). The item-identification component 738 may analyze the image data 756 using various image processing techniques, or computer vision techniques. For instance, the item-identification component 738 may extract a representation of an item depicted in the image data 756 generated by at least one imaging device. The representation may include identifying text printed on the item, colors or color schemes printed in the item, determining 2-D and/or 3D shapes of the items, and/or other techniques for extract a representation of the item. In some instances, the representation of the item depicted in the image data 756 may comprise a numeric representation, such as a feature vector or a set of feature vectors.

In some examples, a data store 750 stored in the memory 724 may include item data 758, which may include representations of the items offered for acquisition at the facility. The item-identification component 738 may compare the extracted represented of the item with the "gallery" or stored representations of the known items in the item data 758. In some instance, the item representation may include an indication of a barcode or SKU data for the item as recognized in, or extracted from, the image data 756. The item-identification component 738 may determine confidence level data 762 based on the comparisons with item representation in the item data 758. The item-identification component 738 may determine, and assign, confidence levels indicating how likely it is that the item represented in the image data 756 corresponds to an item from the item gallery in the item data 758. Based on the confidence level data 762, the item-identification component 738 may determine an item identifier 770 for the item in the image data 756 (or multiple item identifiers 770) that corresponds to an item in the item data 758 to which the item corresponds.

In some examples, the data store 750 may include physical-layout data 774 that is used by the item-identification component 738 to determine the item. The physical-layout data 774 may include or provide a mapping of physical locations within the physical layout of devices and objects such that the location of the apparatus 700 may be utilized to determine an item stored nearby. The physical-layout data 774 may indicate the coordinates within the facility of an inventory location 712, items stored at that inventory location 712, and so forth. In examples where the apparatus 700 has location determining sensors (e.g., GPS, RFID, proximity, etc.), the location sensor data may be used to determine where in the store the user 708 is. In such examples, the item-identification component 738 may access the physical-layout data 774 to determine if a location associated with the event is associated with items, and confidence levels for the corresponding representations of items in the item data 758. Continuing the example above, given the location within the facility of the event and image camera data, the physical-layout data 774 may determine the items that may have been represented in generated images of the event.

The apparatus management system 730 may further include an event-determination component 740 to determine event-description data 760 for the item in the image data 756. The event-determination component 740 may determine if the user 708 is adding an item to the apparatus 700, removing the item from the apparatus 700, etc., based on movement of the item and/or whether the item is shown in the image data 756. For instance, if the item is shown as being moved downward towards the interior of the apparatus 700, and the user's hand then leaves the basket without the item, it can be determined that the user 708 added the item to the apparatus 700. Similarly, if the user's hand moves into the apparatus without an item and is depicted in the image data 756 taking an item from the apparatus, the event-determination component 740 may determine that the user 708 removed an item from the apparatus 700.

The apparatus management system 730 may also include a virtual-apparatus management component 742 configured to manage virtual shopping apparatus data 768 for the apparatus 700. For instance, the virtual-apparatus management component 742 may utilize the item data 758, event-description data 760, and confidence level data 762 to add item identifier(s) 770 to the virtual shopping apparatus data 768 for items that were added to the apparatus 700, remove item identifier(s) 770 from the virtual shopping apparatus data 768 for items that were removed from the apparatus 700, and track item quantity data 772 indicating quantities of particular items in the apparatus 700.

The apparatus management system 730 may further include a user-interface component 744 configured to present user interfaces on the display 736 based on user-interface data 776. The user interfaces 776 may include one or more fields to present data, and/or receive touch input (or other input via a keyboard, mouse, etc.) from a user 708. For instance, if the item-identification component 738 is unable to determine an item identifier 770 for an item shown in the image data 756, the user-interface component 744 may receive inquiry data 764 generated by an inquiry component 764 to prompt a user 708 for feedback to help identify the item, and/or other information (e.g., if multiple items were placed in the apparatus 700). The inquiry component 746 may be configured to generate inquiry data 764 based on the information needed to identify the item. For instance, the inquiry data 764 may include a prompt to request particular feedback from the user 708, such as to provide input (e.g., touch input, vocal/utterance input, etc.) to identify the item, input to indicate how many items were added to the apparatus, input to indicate whether an item was removed or added, etc. In some examples, the user-interface component 744 may present one or more images depicting items from the item data 758 that have the highest confidence levels as corresponding to the item in the image data 756, but confidence levels that are not high enough to make a final decision as to the item. For instance, the user-interface component 744 may present pictures of two different items that have high confidence levels 762 and request that the user 708 select or indicate the appropriate item. Additionally, or alternatively, the user-interface component 744 may present user-interface data 776 that prompts the user for feedback regarding whether or not the item was added to, or removed from the apparatus 700. Responses to the inquiry data 764 may be stored as response data 766.

In some examples, the apparatus management system 730 may further a power-saving component 780 configured to selectively power off or down one or more components of the apparatus 700 when the apparatus 700 determines that no users are within a threshold distance of the apparatus 700.

For example, the power-saving component 780 may be configured to determine when a user is not within a threshold distance and, in response, may instruct one or more components of the apparatus 700 to power off or otherwise lessen the power the components consume from the batter (ies) 716. For example, the power-saving component may instruct the item-identification component 738 and/or the event-determination component 740 to stop performing image-processing on the image data 756 generated by the imaging devices or may instruct these components to perform the image-processing at a lesser frame rate. Additionally, or alternatively, the power-saving component may instruct the user-activation component 732 or the activity-detection component 734 to refrain from performing image-processing on the image data 756 or lessen the frame rate at which these components perform the image-processing. In addition, or in the alternative, the power-saving component 780 may instruct any of the other components of the apparatus management system 730 to power off or down in order to consume less power in response to determining that a user is not within the threshold distance of the apparatus 700, and/or may instruct any other software and/or firmware components of the apparatus 700 to power off or down in response.

In addition, or in the alternative, the power-saving component 780 may instruct one or more hardware components of the apparatus 700 to power off or down in response to determining that a user is not within the threshold distance of the apparatus 700. For instance, the power-saving component 780 may instruct the imaging devices to power off or lessen a frame rate at which the imaging components generate the image data. Additionally, or alternatively, the power-saving component 780 may instruct the display 736 to power off (or dim its brightness) and/or may instruct the light sources, lighting elements, weight sensors (and/or weight-sensing firmware/software), the communication interfaces 706, I/O interfaces 704, the microphones 720, the loudspeakers 722, and/or any other hardware component of the apparatus 700 to power off or otherwise consume less power from the batter (ies) 716. Furthermore, in addition to power off or down any of these software, firmware, and/or hardware components of the apparatus 700, the power-saving component 780 may be configured to power on or up each of these components in response to determining that a user is within the threshold distance of the apparatus 700.

The power-saving component 780 may determining whether a user is within the threshold distance of the apparatus 700 based on proximity data 778 generated by the proximity sensors 710. For instance, the power-saving component 780 may receive the proximity data 778 and analyze the proximity data to determine whether a user is within the threshold distance. In some instances, the proximity data 778 indicates, for each sensor or quadrant (or the like) of a sensor, the distance to a closest user or other object. Thus, the power-saving component 780 may determine whether the closest user/object is within the threshold distance and, if not, may send the instruction(s) for causing the component(s) to lessen their consumed power. Further, in some instances, the power-saving component 780 may input the proximity data 778 and/or additional sensor data generated at the same/similar time as the subject proximity data (e.g., image data 756, accelerometer data, etc.) into one or more trained models 782 for determining whether or not the object within the threshold distance of the apparatus corresponds to a user. If the trained model indicates that the object (or each object) detected by the proximity sensors 710 does not correspond to a user, but rather an inanimate object (e.g., a rack in the facility), then the power-saving component 780 may send the instruction(s) to lessen power consumed by the component(s) even if one or more (non-user) objects are detected within the threshold distance of the apparatus. It is to be appreciated that the trained model(s) may be trained by inputting training data in the form of labelled results (user, no user) and corresponding sensor data into the model during the training process. Of course, while one example is provided, the model(s) 782 may be trained in any other manner.

In addition, while the above example describes the proximity sensors 710 outputting proximity data 778 indicating the distance to a nearest object, in some instances the proximity sensors may output an indication when an object is within a threshold distance but not otherwise. For instance, a first proximity sensor may be configured to output an indication in response to detecting an object within one foot, while another proximity sensor (or quadrant of the same proximity sensor) may be configured to output an indication in response to detecting an object within two feet. Thus, these proximity sensors may output the respective indications in response to detecting an object within their respective threshold distances, but otherwise may refrain from outputting data to the power-saving component 780. Thus, the power-saving component 780 may cause the component(s) to power off and/or down based on not receiving an indication of an object within a threshold distance from the proximity sensors 710 for a threshold amount of time. In addition, the power-saving component 780 may cause the component(s) to power off and/or down in response to receiving an indication that each object detected by a proximity sensor 710 within a threshold distance within a certain amount of time does not correspond to a user, as determined by the trained model(s) 782.

FIG. 8 illustrates a block diagram of the one or more servers 932. The servers 932 may be physically present at a facility, such as facility 902 of FIG. 9, may be accessible by the network 930, or a combination of both. The servers 932 do not require end-user knowledge of the physical location and configuration of the system that delivers the services. Common expressions associated with the servers 932 may include "on-demand computing," "software as a service (Saas)," "cloud services," "data centers," and so forth. Services provided by the servers 932 may be distributed across one or more physical or virtual devices.

The servers 932 may include one or more hardware processors 802 (processors) configured to execute one or more stored instructions. The processors 802 may comprise one or more cores. The servers 932 may include one or more input/output (I/O) interface(s) 804 to allow the processor 802 or other portions of the servers 932 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth. FIG. 9 also illustrates I/O devices 806.

The servers 932 may also include one or more communication interfaces 808. The communication interfaces 808 are configured to provide communications between the servers 932 and other devices, such as the sensors 920, the interface devices, routers, and so forth. The communication interfaces 808 may include devices configured to couple to personal area networks (PANs), wired and wireless local area networks (LANs), wired and wireless wide area networks (WANs), and so forth. For example, the communication interfaces 808 may include devices compatible with Ethernet, Wi-Fi™, and so forth. The servers 932 may also include one or more busses or other internal communications hardware or software that allow for the transfer of data between the various modules and components of the servers 932.

The servers 932 may also include a power supply 840. The power supply 840 is configured to provide electrical power suitable for operating the components in the servers 932.

The servers 932 may further include one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the servers 932. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interfaces 804, the communication interfaces 808, and provide various services to applications or components executing on the processors 802. The OS component 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 810. These components may be executed as foreground applications, background tasks, daemons, and so forth. A communication component 814 may be configured to establish communications with one or more of the sensors 920, one or more of the devices used by associates, other servers 932, or other devices. The communications may be authenticated, encrypted, and so forth.

The memory 810 may store an inventory management system 816. The inventory management system 816 is configured to provide the inventory functions as described herein with regard to the inventory management system 922. For example, the inventory management system 816 may track movement of items 904 in the facility 902, generate user interface data, and so forth.

The inventory management system 816 may access information stored in one or more data stores 818 in the memory 810. The data store 818 may use a flat file, database, linked list, tree, executable code, script, or other data structure to store the information. In some implementations, the data store 818 or a portion of the data store 818 may be distributed across one or more other devices including other servers 932, network attached storage devices, and so forth.

The data store 818 may include physical layout data 820. The physical layout data 820 provides a mapping of physical locations within the physical layout of devices and objects such as the sensors 920, inventory locations 914, and so forth. The physical layout data 820 may indicate the coordinates within the facility 902 of an inventory location 914, sensors 920 within view of that inventory location 914, and so forth. For example, the physical layout data 820 may include camera data comprising one or more of a location within the facility 902 of a sensor 920(1), orientation of the sensor 920(1), the operational status, and so forth. Continuing example, the physical layout data 820 may indicate the coordinates of the sensor 920(1), pan and tilt information indicative of a direction that the field of view 928 is oriented along, whether the sensor 920(1) is operating or malfunctioning, and so forth.

In some implementations, the inventory management system 816 may access the physical layout data 820 to determine if a location associated with the event 924 is within the field of view 928 of one or more sensors 920. Continuing the example above, given the location within the facility 902 of the event 924 and the camera data, the inventory management system 816 may determine the sensors 920(1) that may have generated images of the event 924.

The item data 822 comprises information associated with the items 904. The information may include information indicative of one or more inventory locations 914 at which one or more of the items 904 are stored. The item data 822 may also include event data, SKU or other product identifier, price, quantity on hand, weight, expiration date, images of the item 904, detail description information, ratings, ranking, and so forth. Still, in some instances, the item data 822 may include device data that associated items with devices that are used to track the locations of the items within the facility 902. The inventory management system 816 may store information associated with inventory management functions in the item data 822.

The data store 818 may also include sensor data 824. The sensor data 824 comprises information acquired from, or based on, the one or more sensors 920. For example, the sensor data 824 may comprise 3D information about an object in the facility 902. As described above, the sensors 920 may include a sensor 920(1), which is configured to acquire one or more images. These images may be stored as the image data 826. The image data 826 may comprise information descriptive of a plurality of picture elements or pixels. Non-image data 828 may comprise information from other sensors 920, such as input from microphones, weight sensors, and so forth.

User data 830 may also be stored in the data store 818. The user data 830 may include identity data, information indicative of a profile, purchase history, location data, demographic data, and so forth. Individual users 916 or groups of users 916 may selectively provide user data 830 for use by the inventory management system 922. The individual users 916 or groups of users 916 may also authorize collection of the user data 830 during use of the facility 902 or access to user data 830 obtained from other systems. For example, the user 916 may opt-in to collection of the user data 830 to receive enhanced services while using the facility 902.

In some implementations, the user data 830 may include information designating a user 916 for special handling. For example, the user data 830 may indicate that a particular user 916 has been associated with an increased number of errors with respect to output data 926. The inventory management system 816 may be configured to use this information to apply additional scrutiny to the events 924 associated with this user 916. For example, events 924 that include an item 904 having a price or result above the threshold amount may be provided to the associates for processing regardless of the determined level of confidence in the output data 926 as generated by the automated system.

The inventory management system 816 may include one or more of a location component 832, identification component 834, event-determination component 836, and inquiry component 838, potentially amongst other components 856.

The location component 832 functions to locate items or users within the environment of the facility to allow the inventory management system 816 to assign certain events to the correct users. That is, the location component 832 may assign unique identifiers to users as they enter the facility and, with the users' consent, may locate the users throughout the facility 902 over the time they remain in the facility 902. The location component 832 may perform this locating using sensor data 824, such as the image data 826. For example, the location component 832 may receive the image data 826 and analyze the image data 826 to identify users from the images. After identifying a particular user within the facility, the location component 832 may then locate the user within the images as the user moves throughout the facility 902. Further, should the location component 832 temporarily "lose" a particular user, the location component 832 may again attempt to identify the users within the facility based on facial recognition, and/or using other techniques such as voice recognition, or the like.

Therefore, upon receiving the indication of the time and location of the event in question, the location component 832 may query the data store 818 to determine which one or more users were at or within a threshold distance of the location of the event at the particular time of the event. Further, the location component 832 may assign different confidence levels to different users, with the confidence levels indicating how likely it is that each corresponding user is the user that is in fact associated with the event of interest.

The location component 832 may access the sensor data 824 in order to determine this location data of the user and/or items. The location data provides information indicative of a location of an object, such as the item 904, the user 916, the tote 918, and so forth. The location may be absolute with respect to the facility 902 or relative to another object or point of reference. Absolute terms may comprise a latitude, longitude, and altitude with respect to a geodetic reference point. Relative terms may include a location of 210.4 meters (m) along an x-axis and 710.2 m along a y-axis as designated by a floor plan of the facility 902, 10.2 m from an inventory location 914 along a heading of 90°, and so forth. For example, the location data may indicate that the user 916(1) is 210.2 m along the aisle 912(1) and standing in front of the inventory location 914. In comparison, a relative location may indicate that the user 916(1) is 32 cm from the tote 918 at a heading of 73° with respect to the tote 918. The location data may include orientation information, such as which direction the user 916 is facing. The orientation may be determined by the relative direction the user's body is facing. In some implementations, the orientation may be relative to the interface device. Continuing the example, the location data may indicate that the user 916(1) is oriented with a heading of 0°, or looking north. In another example, the location data may indicate that the user 916 is facing towards the interface device.

The identification component 834 is configured to identify an object. In one implementation, the identification component 834 may be configured to identify an item 904. In another implementation, the identification component 834 may be configured to identify an identifier associated with the user 916. For example, the identification component 834 may process the image data 826 and determine the identity data of the user 916 depicted in the images by comparing the characteristics in the image data 826 with previously stored results. The identification component 834 may also access data from other sensors 920, such as from an RFID reader, an RF receiver, fingerprint sensors, and so forth.

The event-determination component 836 is configured to process the sensor data 824 and generate output data 926, and may include components described above. The event-determination component 836 may access information stored in the data store 818 including, but not limited to, event-description data 842, confidence levels 844, or threshold values. In some instances, the event-determination component 836 may be configured to perform some or all of the techniques described above with regards to the event-determination component 836. For instance, the event-determination component 836 may be configured to create and utilize event classifiers for identifying events (e.g., predefined activity) within image data, potentially without use of other sensor data acquired by other sensors in the environment.

The event-description data 842 comprises information indicative of one or more events 924. For example, the event-description data 842 may comprise predefined profiles that designate movement of an item 904 from an inventory location 914 with the event 924 of "pick". The event-description data 842 may be manually generated or automatically generated. The event-description data 842 may include data indicative of triggers associated with events occurring in the facility 902. An event may be determined as occurring upon detection of the trigger. For example, sensor data 824 such as a change in weight from a sensor 920 at an inventory location 914 may trigger detection of an event of an item 904 being added or removed from the inventory location 914. In another example, the trigger may comprise an image of the user 916 reaching a hand toward the inventory location 914. In yet another example, the trigger may comprise two or more users 916 approaching to within a threshold distance of one another.

The event-determination component 836 may process the sensor data 824 using one or more techniques including, but not limited to, artificial neural networks, classifiers, decision trees, support vector machines, Bayesian networks, and so forth. For example, the event-determination component 836 may use a decision tree to determine occurrence of the "pick" event 924 based on sensor data 824. The event-determination component 836 may further use the sensor data 824 to determine one or more tentative results 848. The one or more tentative results 848 comprise data associated with the event 924. For example, where the event 924 comprises a disambiguation of users 916, the tentative results 848 may comprise a list of possible user identities. In another example, where the event 924 comprises a disambiguation between items, the tentative results 848 may comprise a list of possible item identifiers. In some implementations, the tentative result 848 may indicate the possible action. For example, the action may comprise the user 916 picking, placing, moving an item 904, damaging an item 904, providing gestural input, and so forth.

In some implementations, the tentative results 848 may be generated by other components. For example, the tentative results 848 such as one or more possible identities or locations of the user 916 involved in the event 924 may be generated by the location component 832. In another example, the tentative results 848 such as possible items 904 that may have been involved in the event 924 may be generated by the identification component 834.

The event-determination component 836 may be configured to provide a confidence level 844 associated with the determination of the tentative results 848. The confidence level 844 provides indicia as to the expected level of accuracy of the tentative result 848. For example, a low confidence level may indicate that the tentative result 848 has a low probability of corresponding to the actual circumstances of the event 924. In comparison, a high confidence level may indicate that the tentative result 848 has a high probability of corresponding to the actual circumstances of the event 924.

In some implementations, the tentative results 848 having confidence levels 844 that exceed the threshold may be deemed to be sufficiently accurate and thus may be used as the output data 926. For example, the event-determination component 836 may provide tentative results 848 indicative of the three possible items 904(1), 904(2), and 904(3) corresponding to the "pick" event 924. The confidence levels 844 associated with the possible items 904(1), 904(2), and 904(3) may be 210%, 70%, 102%, respectively. Continuing the example, the threshold value 1046 may be set such that confidence level 844 of 100% are deemed to be sufficiently accurate. As a result, the event-determination component 836 may designate the "pick" event 924 as involving item 904(3).

The inquiry component 838 may be configured to use at least a portion of the sensor data 824 associated with the event 924 to generate inquiry data 850. In some implementations, the inquiry data 850 may include one or more of the tentative results 848 or supplemental data 852. The inquiry component 838 may be configured to provide inquiry data 850 to one or more devices associated with one or more human associates.

An associate user interface is presented on the respective devices of associates. The associate may generate response data 854 by selecting a tentative result 848, entering new information, indicating that they are unable to answer the inquiry, and so forth.

The supplemental data 852 comprises information associated with the event 924 or that may be useful in interpreting the sensor data 824. For example, the supplemental data 852 may comprise previously stored images of the items 904. In another example, the supplemental data 852 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 826 during presentation to an associate.

The inquiry component 838 processes the response data 854 provided by the one or more associates. The processing may include calculating one or more statistical results associated with the response data 854. For example, statistical results may include a count of the number of times associates selected a tentative result 848, determination of a percentage of the associates that selected a tentative result 848, and so forth.

The inquiry component 838 is configured to generate the output data 926 based at least in part on the response data 854. For example, given that a majority of the associates returned response data 854 indicating that the item 904 associated with the "pick" event 924 is item 904(10), the output data 926 may indicate that the item 904(10) was picked.

The inquiry component 838 may be configured to selectively distribute inquiries to particular associates. For example, some associates may be better suited to answering particular types of inquiries. Performance data, such as statistical data about the performance of the associates, may be determined by the inquiry component 838 from the response data 854 provided by the associates. For example, information indicative of a percentage of different inquiries in which the particular associate selected response data 854 that disagreed with the majority of associates may be maintained. In some implementations, test or practice inquiry data having a previously known correct answer may be provided to the associate for training or quality assurance purposes. The determination of the set of associates to use may be based at least in part on the performance data.

By using the inquiry component 838, the event-determination component 836 may be able to provide high reliability output data 926 that accurately represents the event 924. The output data 926 generated by the inquiry component 838 from the response data 854 may also be used to further train the automated systems used by the inventory management system 816. For example, the sensor data 824 and the output data 926, based on response data 854, may be provided to one or more of the components of the inventory management system 816 for training in process improvement. Continuing the example, this information may be provided to an artificial neural network, Bayesian network, and so forth, to further train these systems such that the confidence level 844 and the tentative results 848 produced in the future for the same or similar input is improved. Finally, as FIG. 13 illustrates, the servers 932 may store and/or utilize other data 860.

In some instances, the servers 932 may further store the timestamp data 858, timestamp data 858 representing locations of users 916 over time, and other data 860.

FIG. 9 represents an illustrative materials handing environment, such as the materials handling facility 902, in which the techniques described herein may be applied to cameras monitoring the environments as described below. However, the following description is merely one illustrative example of an industry and environment in which the techniques described herein may be utilized. The materials handling facility 902 (or "facility") comprises one or more physical structures or areas within which one or more items 904(1), 904(2), . . . , 904(Q) (also referred to as "items 904") may be held. As used in this disclosure, letters in parentheses such as "(Q)" indicate an integer result. The items 904 comprise physical goods, such as books, pharmaceuticals, repair parts, electronic gear, groceries, and so forth.

The facility 902 may include one or more areas designated for different functions with regard to inventory handling. In this illustration, the facility 902 includes a receiving area 906, a storage area 908, and a transition area 910. The receiving area 906 may be configured to accept items 904, such as from suppliers, for intake into the facility 902. For example, the receiving area 906 may include a loading dock at which trucks or other freight conveyances unload the items 904.

The storage area 908 is configured to store the items 904. The storage area 908 may be arranged in various physical configurations. In one implementation, the storage area 908 may include one or more aisles 912. The aisle 912 may be configured with, or defined by, inventory locations 914 on one or both sides of the aisle 912. The inventory locations 914 may include one or more of shelves, racks, cases, cabinets, bins, floor locations, or other suitable storage mechanisms for holding or storing the items 904. The inventory locations 914 may be affixed to the floor or another portion of the facility's structure, or may be movable such that the arrangements of aisles 912 may be reconfigurable. In some implementations, the inventory locations 914 may be configured to move independently of an outside operator. For example, the inventory locations 914 may comprise a rack with a power source and a motor, operable by a computing device to allow the rack to move from one location within the facility 902 to another.

One or more users 916(1), 916(2) (also referred to as "users 916")), totes 918(1), 918(2) (also referred to as "totes 918")) or other material handling apparatus may move within the facility 902. For example, the users 916 may move about within the facility 902 to pick or place the items 904 in various inventory locations 914, placing them on the totes 918 for ease of transport. A tote 918 is configured to carry or otherwise transport one or more items 904. For example, a tote 918 may include a basket, a cart, a bag, and so forth. In other implementations, other agencies such as robots, forklifts, cranes, aerial drones, and so forth, may move about the facility 902 picking, placing, or otherwise moving the items 904.

One or more sensors 920 may be configured to acquire information in the facility 902. The sensors 920 in the facility 902 may include sensors fixed in the environment (e.g., ceiling-mounted cameras) or otherwise, such as sensors in the possession of users (e.g., mobile phones, tablets, etc.). The sensors 920 may include, but are not limited to, sensors 920(1), weight sensors, radio frequency (RF) receivers, temperature sensors, humidity sensors, vibration sensors, and so forth. The sensors 920 may be stationary or mobile, relative to the facility 902. For example, the inventory locations 914 may contain sensors 920(1) configured to acquire images of pick or placement of items 904 on shelves, of the users 916(1) and 916(2) in the facility 902, and so forth. In another example, the floor of the facility 902 may include weight sensors configured to determine a weight of the users 916 or another object thereupon.

During operation of the facility 902, the sensors 920 may be configured to provide information suitable for tracking how objects move or other occurrences within the facility 902. For example, a series of images acquired by a sensor 920(1) may indicate removal of an item 904 from a particular inventory location 914 by one of the users 916 and placement of the item 904 on or at least partially within one of the totes 918.

While the storage area 908 is depicted as having one or more aisles 912, inventory locations 914 storing the items 904, sensors 920, and so forth, it is understood that the receiving area 906, the transition area 910, or other areas of the facility 902 may be similarly equipped. Furthermore, the arrangement of the various areas within the facility 902 is depicted functionally rather than schematically. For example, multiple different receiving areas 906, storage areas 908, and transition areas 910 may be interspersed rather than segregated in the facility 902.

The facility 902 may include, or be coupled to, an inventory management system 922, which may perform some or all of the techniques described above with reference to FIGS. 1-8. For example, the inventory management system 922 may maintain a virtual cart of each user within the facility. The inventory management system 922 may also store a record associated with each user indicating an identifier associated with the user, the location of the user, and whether the user is eligible to exit the facility with one or more items without performing a manual checkout of the items. The inventory management system 922 may also generate and output notification data to the usersm 1416, indicating whether or not they are so eligible.

As illustrated, the inventory management system 922 may reside at the facility 902 (e.g., as part of on-premises servers), on the servers 932 that are remote from the facility 902, a combination thereof. In each instance, the inventory management system 922 is configured to identify interactions and events with and between users 916, devices such as sensors 920, robots, material handling equipment, computing devices, and so forth, in one or more of the receiving area 906, the storage area 908, or the transition area 910. As described above, some interactions may further indicate the existence of one or more events 924, or predefined activities of interest. For example, events 924 may include the entry of the user 916 to the facility 902, stocking of items 904 at an inventory location 914, picking of an item 904 from an inventory location 914, returning of an item 904 to an inventory location 914, placement of an item 904 within a tote 918, movement of users 916 relative to one another, gestures by the users 916, and so forth. Other events 924 involving users 916 may include the user 916 providing authentication information in the facility 902, using a computing device at the facility 902 to authenticate identity to the inventory management system 922, and so forth. Some events 924 may involve one or more other objects within the facility 902. For example, the event 924 may comprise movement within the facility 902 of an inventory location 914, such as a counter mounted on wheels. Events 924 may involve one or more of the sensors 920. For example, a change in operation of a sensor 920, such as a sensor failure, change in alignment, and so forth, may be designated as an event 924. Continuing the example, movement of a sensor 920(1) resulting in a change in the orientation of the field of view 928 (such as resulting from someone or something bumping the sensor 920(1)) may be designated as an event 924.

By determining the occurrence of one or more of the events 924, the inventory management system 922 may generate output data 926. The output data 926 comprises information about the event 924. For example, where the event 924 comprises an item 904 being removed from an inventory location 914, the output data 926 may comprise an item identifier indicative of the particular item 904 that was removed from the inventory location 914 and a user identifier of a user that removed the item.

The inventory management system 922 may use one or more automated systems to generate the output data 926. For example, an artificial neural network, one or more classifiers, or other automated machine learning techniques may be used to process the sensor data from the one or more sensors 920 to generate output data 926. For example, the inventory management system 922 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 926 or the tentative results. The automated systems may generate confidence level data that provides information indicative of the accuracy or confidence that the output data 926 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 80%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 904, user 916, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 916 may pick an item 904(1) such as a perfume bottle that is generally cubical in shape from the inventory location 914. Other items 904 at nearby inventory locations 914 may be predominantly spherical. Based on the difference in shape (cube vs. sphere) from the adjacent items, and the correspondence in shape with the previously stored image of the perfume bottle item 904(1) (cubical and cubical), the confidence level that the user 916 has picked up the perfume bottle item 904(1) is high.

In some situations, the automated techniques may be unable to generate output data 926 with a confidence level above a threshold result. For example, the automated techniques may be unable to distinguish which user 916 in a crowd of users 916 has picked up the item 904 from the inventory location 914. In other situations, it may be desirable to provide human confirmation of the event 924 or of the accuracy of the output data 926. For example, some items 904 may be deemed age restricted such that they are to be handled only by users 916 above a minimum age threshold.

In instances where human confirmation is desired, sensor data associated with an event 924 may be processed to generate inquiry data. The inquiry data may include a subset of the sensor data associated with the event 924. The inquiry data may also include one or more of one or more tentative results as determined by the automated techniques, or supplemental data. The subset of the sensor data may be determined using information about the one or more sensors 920. For example, camera data such as the location of the sensor 920(1) within the facility 902, the orientation of the sensor 920(1), and a field of view 928 of the sensor 920(1) may be used to determine if a particular location within the facility 902 is within the field of view 928. The subset of the sensor data may include images that may show the inventory location 914 or that the item 904 was stowed. The subset of the sensor data may also omit images from other sensors 920(1) that did not have that inventory location 914 in the field of view 928. The field of view 928 may comprise a portion of the scene in the facility 902 that the sensor 920 is able to generate sensor data about.

Continuing the example, the subset of the sensor data may comprise a video clip acquired by one or more sensors 920(1) having a field of view 928 that includes the item 904. The tentative results may comprise the "best guess" as to which items 904 may have been involved in the event 924. For example, the tentative results may comprise results determined by the automated system that have a confidence level above a minimum threshold.

The facility 902 may be configured to receive different kinds of items 904 from various suppliers and to store them until a customer orders or retrieves one or more of the items 904. A general flow of items 904 through the facility 902 is indicated by the arrows of FIG. 8. Specifically, as illustrated in this example, items 904 may be received from one or more suppliers, such as manufacturers, distributors, wholesalers, and so forth, at the receiving area 906. In various implementations, the items 904 may include merchandise, commodities, perishables, or any suitable type of item 904, depending on the nature of the enterprise that operates the facility 902. The receiving of the items 904 may comprise one or more events 924 for which the inventory management system 922 may generate output data 926.

Upon being received from a supplier at receiving area 906, the items 904 may be prepared for storage. For example, items 904 may be unpacked or otherwise rearranged. The inventory management system 922 may include one or more software applications executing on a computer system to provide inventory management functions based on the events 924 associated with the unpacking or rearrangement. These inventory management functions may include maintaining information indicative of the type, quantity, condition, cost, location, weight, or any other suitable parameters with respect to the items 904. The items 904 may be stocked, managed, or dispensed in terms of countable, individual units or multiples, such as packages, cartons, crates, pallets, or other suitable aggregations. Alternatively, some items 904, such as bulk products, commodities, and so forth, may be stored in continuous or arbitrarily divisible amounts that may not be inherently organized into countable units. Such items 904 may be managed in terms of measurable quantity such as units of length, area, volume, weight, time, duration, or other dimensional properties characterized by units of measurement. Generally speaking, a quantity of an item 904 may refer to either a countable number of individual or aggregate units of an item 904 or a measurable amount of an item 904, as appropriate.

After arriving through the receiving area 906, items 904 may be stored within the storage area 908. In some implementations, like items 904 may be stored or displayed together in the inventory locations 914 such as in bins, on shelves, hanging from pegboards, and so forth. In this implementation, all items 904 of a given kind are stored in one inventory location 914. In other implementations, like items 904 may be stored in different inventory locations 914. For example, to optimize retrieval of certain items 904 having frequent turnover within a large physical facility 902, those items 904 may be stored in several different inventory locations 914 to reduce congestion that might occur at a single inventory location 914. Storage of the items 904 and their respective inventory locations 914 may comprise one or more events 924. In some instances, device(s) may be placed on one or more of the items 904, where the devise(s) are used to track the one or more items 904 while within the facility 902, as described herein.

When a customer order specifying one or more items 904 is received, or as a user 916 progresses through the facility 902, the corresponding items 904 may be selected or "picked" from the inventory locations 914 containing those items 904. In various implementations, item picking may range from manual to completely automated picking. For example, in one implementation, a user 916 may have a list of items 904 they desire and may progress through the facility 902 picking items 904 from inventory locations 914 within the storage area 908, and placing those items 904 into a tote 918. In other implementations, employees of the facility 902 may pick items 904 using written or electronic pick lists derived from customer orders. These picked items 904 may be placed into the tote 918 as the employee progresses through the facility 902. Picking may comprise one or more events 924, such as the user 916 in moving to the inventory location 914, retrieval of the item 904 from the inventory location 914, and so forth.

After items 904 have been picked, they may be processed at a transition area 910. The transition area 910 may be any designated area within the facility 902 where items 904 are transitioned from one location to another or from one entity to another. For example, the transition area 910 may be a packing station within the facility 902. When the item 904 arrives at the transition area 910, the items 904 may be transitioned from the storage area 908 to the packing station. The transitioning may comprise one or more events 924. Information about the transition may be maintained by the inventory management system 922 using the output data 926 associated with those events 924.

In another example, if the items 904 are departing the facility 902 a list of the items 904 may be obtained and used by the inventory management system 922 to transition responsibility for, or custody of, the items 904 from the facility 902 to another entity. For example, a carrier may accept the items 904 for transport with that carrier accepting responsibility for the items 904 indicated in the list. In another example, a customer may purchase or rent the items 904 and remove the items 904 from the facility 902. The purchase or rental may comprise one or more events 924.

The inventory management system 922 may access or generate sensor data about the facility 902 and the contents therein including the items 904, the users 916, the totes 918, and so forth. The sensor data may be acquired by one or more of the sensors 920, data provided by other systems, and so forth. For example, the sensors 920 may include sensors 920(1) configured to acquire image data of scenes in the facility 902. The image data may comprise still images, video, or a combination thereof. The image data may be processed by the inventory management system 922 to determine a location of the user 916, the tote 918, the identifier associated with the user 916, and so forth. As used herein, the identifier associated with the user may represent a unique identifier of the user (e.g., number associated with user, username, etc.), an identifier that distinguishes the user amongst other users being located within the environment, or the like.

The inventory management system 922, or systems coupled thereto, may be configured to determine the identifier associated with the user 916, as well as to determine other candidate users. In one implementation, this determination may comprise comparing sensor data with previously stored identity data. For example, the identifier associated with the user 916 may be identified by presenting a token carrying authentication credentials, providing a fingerprint, scanning a barcode or other type of unique identifier upon entering the facility, and so forth. The identifier associated with the user 916 may be determined before, during, or after entry to the facility 902. Determination of the user's identifier may comprise comparing sensor data associated with the user 916 in the facility 902 to previously stored user data.

In some instances, the inventory management system 922 groups users within the facility into respective sessions. That is, the inventory management system 922 may utilize the sensor data to determine groups of users that are effectively "together" (e.g., shopping together). In some instances, a particular session may include multiple users that entered the facility 902 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 918. Noting the child and the mother as belonging to the same session may increase the chances of successfully adding the box of cereal to the virtual shopping cart of the mother.

By determining the occurrence of one or more events 924 and the output data 926 associated therewith, the inventory management system 922 is able to provide one or more services to the users 916 of the facility 902. By utilizing one or more human associates to process inquiry data and generate response data that may then be used to produce output data 926, overall accuracy of the system may be enhanced. The enhanced accuracy may improve the user experience of the one or more users 916 of the facility 902. In some examples, the output data 926 may be transmitted over a network 930 to one or more servers 932.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system comprising:
   an item identification apparatus comprising:
      a basket to receive an item;
      a first sensor array configured to generate first sensor data associated with the item being placed into the basket;
   a put back bin comprising:
      a receptacle;
      a second sensor array configured to generate second sensor data associated with the item being placed into the receptacle;
   one or more processors; and
   one or more computer-readable media storing instructions that, when executed by the one or more processors, cause the one or more processors to perform operations comprising:
      analyzing the first sensor data to determine a first identifier of the item based at least in part on the first sensor data;
      determining, based on the first sensor data, that the item was placed in the basket;
      updating, based on the first identifier, a virtual cart associated with a user operating the item identification apparatus to indicate addition of the item;
      determining, based on the first sensor data, that the item was removed from the basket;
      determining, based on the second sensor data, that the item was placed within the receptacle of the put back bin;
      updating, in response to determining that the item was placed within the receptacle, the virtual cart to indicate removal of the item; and
      instructing to charge a payment instrument associated with the virtual cart.

2. The system of claim 1, wherein the item identification apparatus further comprises an outer shield that at least partially surrounds the basket and shields the first sensor array, such that the first sensor array is configured to capture sensor data of items inside the basket and not outside the outer shield.

3. The system of claim 2, wherein the first sensor array comprises:
   a first antenna positioned between a first outer surface of the basket and a first inner surface of the outer shield;
   a second antenna positioned between a second outer surface of the basket and a second inner surface of the outer shield, wherein the second antenna is oriented perpendicular to the first antenna; and
   a third antenna positioned between a third outer surface of the basket and a third inner surface of the outer shield, wherein the third antenna is oriented perpendicular to the first antenna and perpendicular to the second antenna.

4. A method comprising:
   determining, based on first sensor data, that an item was placed in a first receptacle;
   updating a virtual cart associated with a user operating the first receptacle to indicate addition of the item;
   determining, based on second sensor data, that the item was removed from the first receptacle;
   determining a first identity of the item removed from the first receptacle;

determining, based on third sensor data from a second receptacle, that a second item was placed within the second receptacle;

determining a second identity of the second item added to the second receptacle;

updating, in response to determining that the second item was placed within the second receptacle and in response to the first identity corresponding to the second identity, the virtual cart to indicate removal of the item; and instructing to charge a payment instrument associated with the virtual cart.

5. The method as recited in claim 4, wherein the third sensor data comprises sensor data from a sensor array positioned within the second receptacle.

6. The method as recited in claim 4, wherein the second receptacle includes an opening to receive and prevent removal of the item.

7. The method as recited in claim 4, wherein the second sensor data comprises RFID data associated with an RFID tag of the item.

8. The method as recited in claim 4, wherein the third sensor data comprises image data.

9. The method as recited in claim 4, wherein the first sensor data comprises a first dataset from a first sensor and a second dataset from a second sensor, and wherein the first sensor generates the first dataset in response to the item being placed in the first receptacle, and the second sensor generates the second dataset in response to the first dataset.

10. The method as recited in claim 9, wherein the second dataset comprises data associated with an identity of the item.

11. The method as recited in claim 4, wherein the first receptacle comprises a receptacle of a self-checkout kiosk.

12. The method as recited in claim 4, wherein the first receptacle comprises a receptacle of a shopping cart.

13. The method as recited in claim 4, wherein, in response to the first identity not corresponding to the second identity, the virtual cart is not updated to indicate removal of the item.

14. A system comprising:
one or more processors; and
one or more computer-readable media storing instructions that, when executed by the one or more processors, cause the one or more processors to perform operations comprising:
determining, based on first sensor data, that an item was placed in a receptacle;
updating a virtual cart associated with a user operating the receptacle to indicate addition of the item;
determining, based on second sensor data, that the item was removed from the receptacle;
determining, based on third sensor data, that the item was placed within a put back bin;
updating, in response to determining that the item was removed from the receptacle and determining that the item was placed within the put back bin, the virtual cart to indicate removal of the item; and
instructing to charge a payment instrument associated with the virtual cart.

15. The system as recited in claim 14, wherein updating the virtual cart to indicate removal of the item comprises:
determining a first identity of a first item removed from the receptacle; and
determining a second identity of a second item added to the put back bin, and wherein the virtual cart is updated in response to the first identity corresponding to the second identity.

16. The system as recited in claim 15, wherein, in response to the first identity not corresponding to the second identity, the virtual cart is not updated to indicate removal of the item.

17. The system as recited in claim 14, wherein the first sensor data comprises a first dataset from a first sensor and a second dataset from a second sensor, and wherein the first sensor generates the first dataset in response to the item being placed in the receptacle, and the second sensor generates the second dataset in response to the first data.

18. The system as recited in claim 17, wherein the second dataset comprises data associated with an identity of the item.

19. The system as recited in claim 14, wherein the third sensor data comprises sensor data from a sensor array positioned within the put back bin.

* * * * *